United States Patent
Bandaru et al.

(10) Patent No.: US 7,930,302 B2
(45) Date of Patent: Apr. 19, 2011

(54) METHOD AND SYSTEM FOR ANALYZING USER-GENERATED CONTENT

(75) Inventors: Nagaraju Bandaru, San Jose, CA (US);
Eric D. Moyer, Belmont, CA (US);
Shrisha Radhakrishna, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 507 days.

(21) Appl. No.: 11/982,936

(22) Filed: Nov. 5, 2007

(65) Prior Publication Data

US 2008/0133488 A1   Jun. 5, 2008

Related U.S. Application Data

(60) Provisional application No. 60/860,666, filed on Nov. 22, 2006.

(51) Int. Cl.
*G06F 17/30* (2006.01)
*G06F 3/048* (2006.01)

(52) U.S. Cl. .......................... 707/737; 715/810

(58) Field of Classification Search ............... 707/1, 3, 707/999.3, 737; 715/810
See application file for complete search history.

(56) References Cited

U.S. PATENT DOCUMENTS

| | | | | |
|---|---|---|---|---|
| 5,987,457 A * | 11/1999 | Ballard | | 1/1 |
| 7,149,716 B2 * | 12/2006 | Gatto | | 705/36 R |
| 7,523,085 B2 * | 4/2009 | Nigam et al. | | 706/55 |
| 7,558,769 B2 * | 7/2009 | Scott et al. | | 706/45 |
| 2002/0052820 A1 * | 5/2002 | Gatto | | 705/36 |
| 2003/0004942 A1 * | 1/2003 | Bird | | 707/3 |
| 2003/0093419 A1 * | 5/2003 | Bangalore et al. | | 707/3 |
| 2004/0078265 A1 * | 4/2004 | Subramanian et al. | | 705/14 |
| 2005/0091038 A1 * | 4/2005 | Yi et al. | | 704/10 |
| 2005/0149507 A1 | 7/2005 | Nye | | |
| 2005/0187932 A1 * | 8/2005 | Kanayama et al. | | 707/6 |
| 2005/0197893 A1 * | 9/2005 | Landau et al. | | 705/14 |
| 2006/0053156 A1 * | 3/2006 | Kaushansky et al. | | 707/102 |
| 2006/0069589 A1 * | 3/2006 | Nigam et al. | | 705/1 |
| 2006/0200341 A1 * | 9/2006 | Corston-Oliver et al. | | 704/5 |
| 2006/0200342 A1 * | 9/2006 | Corston-Oliver et al. | | 704/10 |
| 2006/0242040 A1 * | 10/2006 | Rader | | 705/35 |
| 2006/0247946 A1 * | 11/2006 | Gordon | | 705/1 |
| 2007/0050389 A1 * | 3/2007 | Kim et al. | | 707/101 |
| 2007/0078833 A1 * | 4/2007 | Chea et al. | | 707/3 |
| 2007/0143122 A1 * | 6/2007 | Holloway et al. | | 705/1 |
| 2008/0071647 A1 * | 3/2008 | McQueen et al. | | 705/27 |
| 2008/0104055 A1 * | 5/2008 | Segel | | 707/5 |
| 2008/0104059 A1 * | 5/2008 | Segel | | 707/5 |
| 2008/0109232 A1 * | 5/2008 | Musgrove et al. | | 705/1 |
| 2008/0281614 A1 * | 11/2008 | Subramanian et al. | | 705/1 |

(Continued)

OTHER PUBLICATIONS

Liu, Bing, et al., "Opinion Observer: Analyzing and Comparing Opinions on the Web", WWW 2005, Chiba, Japan, May 10-14, 2005, pp. 342-351.*

(Continued)

*Primary Examiner* — Robert Stevens
(74) *Attorney, Agent, or Firm* — Osha • Liang LLP

(57) ABSTRACT

A method and system for collecting and analyzing data found across multiple sites on the internet or stored in a self-contained or pre-loaded database, is disclosed which captures, extracts, analyzes, categorizes, synthesizes, summarizes and displays, in a customizable format, both the substance and sentiment embodied within user-generated content, such as comments or reviews, found across such sites and/or stored within such databases.

21 Claims, 18 Drawing Sheets

U.S. PATENT DOCUMENTS

| | | | |
|---|---|---|---|
| 2009/0048823 A1* | 2/2009 | Liu et al. | 704/9 |
| 2009/0112892 A1* | 4/2009 | Cardie et al. | 707/100 |
| 2009/0164417 A1* | 6/2009 | Nigam et al. | 707/2 |
| 2009/0222551 A1* | 9/2009 | Neely et al. | 709/224 |

OTHER PUBLICATIONS

Hu, Minqing, et al., "Mining Opinion Features in Customer Reviews", Proc. of the 19th National Conf. on Artificial Intelligence, San Jose, CA, Jul. 25-29, 2004, pp. 755-760.*

Popescu, Ana-Maria, et al., "Extracting Product Features and Opinions from Reviews", HLT/EMNLP, Vancouver, Canada, Oct. 2005, pp. 339-346.*

Morinaga, Satoshi, et al., "Mining Product Reputations on the Web", SIKDD 02, Edmonton, Alberta, Canada, © 2002, pp. 341-349.*

Wilson, Theresa, et al., "Just How Mad Are You? Finding Strong and Weak Opinion Clauses", Proc. of the 19th National Conf. on Artificial Intelligence, San Jose, CA, Jul. 25-29, 2004, pp. 761-767.*

Liu, D. Tony, et al., "A Review of Web-Based Product Data Management Systems", Computers in Industry, vol. 44, Issue 3, Apr. 2001, pp. 251-262.*

Glover, Eric J., et al., "Improving Category Specific Web Search by Learning Query Modifications", SAINT 2001, San Diego, CA, Jan. 8-12, 2001, pp. 23-31.*

Hu, Minqing, et al., "Mining and Summarizing Customer Reviews", KDD '04, Seattle, WA, Aug. 22-25, 2004, pp. 168-177.*

Zamir, Oren, et al., "Grouper: A Dynamic Clustering Interface to Web Search Results", Proc. of the 8th International World Wide Web Conf., © 1999, pp. 1-15.*

The American Heritage College Dictionary, 4th Ed., Houghton Mifflin Co., Boston, MA, © 2002, p. 1264.*

Marshall, Byron, et al., "EBizPort: Collecting and Analyzing Business Intelligence Information", Journal of the American Society for Information Science and Technology, vol. 55, No. 10, Aug. 2004, pp. 873-891.*

Schafer, J. Ben, et al., "E-Commerce Recommendation Applications", Data Mining and Knowledge Discovery, vol. 5, Kluwer Academic Publishers, The Netherlands, © 2001, pp. 115-153.*

Kim, Soo-Min, et al., "Automatic Identification of Pro and Con Reasons in Online Reviews", Proc. of the COLING/ACL Main Conf. Poster Sessions, Sydney, Australia, Jul. 2006, pp. 483-490.*

Gamon, Michael, et al., "Pulse: Mining Customer Opinions from Free Text", IDA 2005, LNCS 3646, Springer-Verlag, Berlin, Germany, Aug. 17, 2005, pp. 121-132.*

Dave, Kushal, et al., "Mining the Peanut Gallery: Opinion Extraction and Semantic Classification Product Reviews", WWW 2003, Budapest, Hungary, May 20-24, 2003, pp. 519-528.*

Whittaker, Steve, et al., "Chapter 14: Evaluating Dialogue Strategies in Multimodal Dialogue Systems", Spoken Multimodal Human-Computer Dialogue in Mobile Environment, Springer Netherlands, © 2005, pp. 247-268.*

Thakkar, Snehal, et al., "Dynamically Composing Web Services from On-line Sources", AAAI Technical Report WS-02-07, American Association for Artificial Intelligence, © 2002, pp. 1-7.*

Finn, Aidan, et al., "Learning to Classify Documents According to Genre", Journal of the American Society for Information Science and Technology, vol. 57, Issue 11, published online (www.interscience.wiley.com), Jul. 14, 2006, pp. 1506-1518.*

Kudo, Mineichi, et al., "Specific-Purpose Web Searches on the Basis of Structure and Contents", Federation Over the Web, International Workshop, Dagstuhl Castle, Germany, May 1-6, 2005, pp. 79-96.*

"Data Mining: Text Mining, Visualization and Social Media", (author = Hurst), dated: Oct. 8, 2006, downloaded from: datamining.typepad.com/data_mining/2006/10/boorah_social_m.html, pp. 1-2.*

Okanohara, Daisuke, et al., "Assigning Polarity Scores to Previews Using Machine Learning Techniques", IJCNLP 2005, LNAI 3651, Springer-Verlag, Berlin, Germany, © 2005, pp. 314-325.*

Eslick, Ian Scott, "Searching for Commonsense", Master of Science Thesis, Massachusetts Institute of Technology, Sep. 2006, pp. 1-101.*

Liu, Jian, et al., "Super Parsing: Sentiment Classification with Review Extraction", CIT '05, IEEE Computer Society, © 2005, 7 pages.*

Supplemental European Search Report, issued Jan. 7, 2010, by the European Patent Office (3 pages).

PCT International Preliminary Report on Patentability (IPRP) issued May 26, 2009, by the International Bureau, in International Application No. PCT/US2007/023486 (6 pages).

* cited by examiner

| Word | Category | Grouping |
|---|---|---|
| Burgundy | Wine | Food |
| Shawerma | Menu | Food |
| Bland | Taste | Food |
| Attentive | Service | Service |
| Decor | Interior | Ambiance |
| Expensive | Price | Price |
| Barbecue | Cuisine | Food |
| Barbecue | Preparation | Food |

Fig. 3

| Phrase | Representation |
|---|---|
| "as good as" | Comparator |
| "better than" | Comparator |
| "to die for" | Idiom |

Fig. 4

| Word | Meaning | POS | Priority |
|---|---|---|---|
| delicious | delectable | ADJ | 0 |
| delicious | delicious | ADJ | 1 |
| delicious | luscious | ADJ | 2 |
| delicious | pleasant-tasting | ADJ | 3 |
| delicious | scrumptious | ADJ | 4 |
| delicious | toothsome | ADJ | 5 |
| delicious | yummy | ADJ | 6 |
| delicious | Delicious | NOUN | 0 |

*Fig. 5*

| Word | Rating | Qualifier |
|---|---|---|
| divine | 9 | feeling |
| disappoint | 5 | Unhappy |
| happy | 8 | feeling |
| recommend | 8 | compelling |
| love | 8 | enjoyment |
| like | 7 | enjoyment |
| ok | 5 | feeling |
| hate | 3 | resentment |

*Fig. 8*

| Score | Count of Review Sentences |
|---|---|
| 9 | 8 |
| 8 | 23 |
| 7 | 14 |
| 6 | 4 |
| 5 | 4 |

*Fig. 10*

| Core Attribute | Number of Sentences |
|---|---|
| Overall Restaurant Sentiment | 1 |
| Food | 3,4 |
| Service | 1 |
| Ambiance | 1 |
| Cost* | Optional |

Fig. 12

| Adjective | Qualifies What? | Enforcer | Negator | Score | Type |
|---|---|---|---|---|---|
| exceptional | wine list | NULL | NULL | 10 | Food |
| expensive | place | very | NULL | 10 | Ambiance |
| attentive | service | very | NULL | 10 | Service |
| attentive | service | very | NULL | 10 | Service |
| Amazing | food | NULL | NULL | 9 | Food |
| excellent | calamari | NULL | NULL | 9 | Food |
| Excellent | food | NULL | NULL | 9 | Food |
| amazing | calamari appetize | NULL | NULL | 9 | Food |
| amazing | sauce | NULL | NULL | 9 | Food |
| excellent | food | NULL | NULL | 9 | Food |
| intimate | atmosphere | NULL | NULL | 9 | Ambiance |
| interesting | art | very | NULL | 9 | Ambiance |
| good | service | very | NULL | 9 | Service |
| upscale | fusion food | NULL | NULL | 9 | Food |
| good | food | very | NULL | 9 | Food |
| excellent | atmosphere | NULL | NULL | 9 | Ambiance |
| Beautiful | atmosphere | NULL | NULL | 9 | Ambiance |
| love | food | NULL | NULL | 9 | Food |
| wonderful | dishes | NULL | NULL | 9 | Food |
| classic | dishes | NULL | NULL | 9 | Food |
| amazing | coconut sauce | NULL | NULL | 9 | Food |
| wonderful | Flavor | NULL | NULL | 9 | Food |
| Beautiful | location | NULL | NULL | 9 | Ambiance |
| Beautiful | food | NULL | NULL | 9 | Food |
| stellar | food | NULL | NULL | 9 | Food |
| beautiful | atmosphere | NULL | NULL | 9 | Food |
| terrific | food | NULL | NULL | 9 | Food |
| elegant | food | NULL | NULL | 9 | Food |
| good | wine | very | NULL | 9 | Food |
| Yummy | calamari | NULL | NULL | 9 | Food |
| excellent | beef | NULL | NULL | 9 | Food |
| best | Lychee Martinis | NULL | NULL | 9 | Food |
| ecellent | food | NULL | NULL | 9 | Food |
| wonderful | fresh pan-asian | NULL | NULL | 9 | Food |
| Fantastic | atmosphere | NULL | NULL | 9 | Ambiance |
| Excellent | food | NULL | NULL | 9 | Food |
| best | duck dishes | NULL | NULL | 9 | Food |
| delectable | lime salad | NULL | NULL | 9 | Food |
| excellent | food | NULL | NULL | 9 | Food |
| Wonderful | food | NULL | NULL | 9 | Food |
| amazing | baked cod | NULL | NULL | 9 | Food |
| excellent | rice dishes | NULL | NULL | 9 | Food |
| awesome | food | NULL | NULL | 9 | Food |
| excellent | service | NULL | NULL | 9 | Service |
| love | atmosphere | NULL | NULL | 9 | Ambiance |
| amazing | prawns | NULL | NULL | 9 | Food |
| yummy | beef | NULL | NULL | 9 | Food |
| excellent | service | NULL | NULL | 9 | Service |
| excellent | wine | NULL | NULL | 9 | Food |

*Fig. 13*

BeDRah

NY | LA | SF
Select city ▼

Junnoon eg., "Cheescake factory," "Pizza," "Romantic"

palo alto, ca

Neighborhood, City, Zip or Address

[Go]

Junnoon - 90% Rah'd 650-329-9644
150 University Ave
Palo Alto, CA 94301

☐ Reservations  ☐ Menu  ⇧ Takeout  ◇ Discounts

✍ Write a review
☆ Save for later
✉ E-mail to a friend

Buzz Index: 86 ⓘ
Cuisine: Indian
Neighborhood: Palo Alto
Tags: Private Rooms, Bar, Full Bar, Late Night, Outdoor Dining, Personal wines welcome, Carryout [Add tag(s)]
Update Restaurant Info: Click here

Price: Unavailable
Hours: Lunch: 11:30AM-2:30PM Mon-Fri
Dinner: 5:30PM-10:30PM Mon-Sat View Slideshow (3 pics)

90% Rah'd
Click to vote!

[Boo] 17 Boos    [Rah] 162 Rahs

Review Highlights

"The imaginative menu and attentive service combined with the tasteful decor to make this a very special dining experience, far removed from the average curry and pilau place"

Map

Show Directions ▼
What's all the Buzz about? Browse Palo Alto and find out.

*....CONTINUED on next page*

Fig. 14A

| Reviews | Reservations |

7 sources 90% Rah'd (17 Boos | 162 Rahs)

PROFESSIONAL REVIEWS

MercuryNews See reviews
7 Rah(s): creamy sauce (2) excellent masala(1)   rich peanut(1) sophisticated wine list(1) best dish(1) memorable roasted eggplant(1) typical Indian restaurant(1)
1 Boo(s): inedible velvet lamb kebab(1)

Palo Alto Online Palo Alto Weekly See reviews
4 Rah(s): famous consulting chef Floyd Cardoz(1)   excellent dinner companion(1) splendid fish(1) creative menu(1)

sfgate.com See reviews
11 Rah(s): rich red sauce(2) creative Indian food(2) stellar Chicken dishes(2) delicious naan(1) good wine match(1) coconut sauce(1) creamy chutney(1) classic chicken tikka(1) polished floor (1) interesting bean salad(1)

BLOG REVIEWS

Blogs See reviews
2 Rah(s): typical Indian buffet(1) Interesting presentation(1)

USER REVIEWS

CitySearch See reviews
23 Rah(s): expensive dishes(2) excellent Service(2) great Indian food(2) great flavor(2) great Indian restaurant(2) memorable tandoori coconut halibut(1) fantastic lunch(1) great ginger chocolatge cake(1) pricey naan(1) great breads(1)
1 Boo(s): OK service(3)

Palo Alto Online See reviews
4 Rah(s): wonderful spicy sauce(1) great Mystic Mojitos(1) wonderful salsa(1) better Bass(1)

Yahoo See reviews
5 Rah(s): imaginative menu(4) tasteful decor(3) imaginative service(2) fabulous Presentation(1) typical indian restaurant(1)
1 Boo(s): average pilau place(2)

Others
39 Rah(s): GREAT service(12) favorite good value places(5) very decor(4) stylish contemporary Indian restaurant(4) creamy coconut sauce(4) Nice eggplant dish(3) delicious goat cheese naan(3) good flavor(3) big time(3) interesting fusion(2)
7 Boo(s): bland sea bass(2) poor wine list(1) bad sushi restaurant(1) worst bean salad(1) bad Indian food(1) watered-down flavor(1) slow Service(1)

Also Recommended

Village Pub
Le Charm French Bistro
El Mansour Restaurants
Maverick
Boulangerie Bay Bread

Most Buzz'd

Mantra Buzz: 132
friendly service didn't(20), tasteful decor(6), great wines(6)
Zibibbo Buzz: 169
great places(16), relaxed atmosphere(14), better places(10)
Junnoon Buzz: 86
GREAT service(12), Very decor(4), imaginative menu(4)
La Bodeguita Del Medio Buzz: 184
nice fun place(26), great mojitos(16)
Lavanda Buzz: 91
overpriced wines(16), Great service(5), outstanding menu(3)

*Fig. 14B*

BooRah Restaurant Search

My Metro: NY I LA I SF

Login I Sign up I Blog

Search for:
[new york, ny] [Go]
eg., "Cheescake factory","Pizza","Romantic"  Neighborhood, City, Zip or Address Boo Rah scans millions of reviews to give you the Boo and the Rah of the place

Search by Cuisine

Sandwich (989)        Mexican (263)
Pizza (899)           Sushi (253)
Delicatessens (810)   Bar (233)
Itallian (622)        American (Traditional) (214)
Chinese (439)         American (New) (164)
Coffee (416)          French (157)
Japanese (349)        Fast Food (155)

Browse all

Latest Reviews | Most Buzz'd ☆ | Most Rah'd

Most Rah'd Restaurants in the past 30 days

Pommes Frites, New York   97% Rah'd
Cuisines: Belgian  Price: < $7
Rahs: perfect fries(28), amazing sauce selection(12), tasty roasted garlic mayo sauce dude(11), best places(9), amazing fries(8), love fries(6), best fries(5), friendly Service People(4)

Boos: OK taste(1), worst fries EVER(1)

New Openings

Nov 2007   Back Forty, New York
Nov 2007   Bocca di Bacco, New York
Nov 2007   18 Avenue B, New York
Nov 2007   Allen & Delancey, New York
Oct 2007   2nd Avenue Deli, New York ....CONTINUED on next page

*Fig. 16A*

METHOD AND SYSTEM FOR ANALYZING USER-GENERATED CONTENT

CROSS-REFERENCE TO RELATED APPLICATIONS

This application claims the benefit of Provisional Patent Application Ser. No. U.S. 60/860,666 filed Nov. 22, 2006 by the present inventors.

FEDERALLY SPONSORED RESEARCH

None

SEQUENCE LISTING

None

BACKGROUND OF THE INVENTION

This invention relates, in general, to a method and system for collecting and analyzing data mined from multiple sites on the internet, and/or stored in self-contained or pre-loaded databases and, in particular, to a method and system for capturing, extracting, analyzing, categorizing, synthesizing, summarizing and displaying, in a customizable format, both the substance and sentiment embodied within such data, particularly, but not exclusively, when such data comprises user-generated content, such as commentary or reviews or public feedback.

In today's internet-savvy world, people frequently conduct online research before making many of their traditional consumer purchasing decisions. For example, before buying a particular product or service, or when deciding among different kinds of similar products or services, individuals will frequently research the experiences that others have had in buying and using the same or similar product, taking into consideration both the performance of the product as well as the level and quality of customer service provided by a particular merchant or manufacturer. By way of illustration, before purchasing a digital camera, a user may narrow down his/her selection to two or three models through a simple filtering process based on price, features and availability. Then, before making a final decision on which product to purchase, they may go to one of the professional product review websites such as CNET.com or Popular Photography to research the pros and cons of that product in the eyes of a professional photographic equipment reviewer. They may also go to an enthusiast site such as dpreview.com, Steve's Digicams or Imaging Resource to gather additional information before making a final decision. These enthusiast sites, which are often run in a very professional manner and may contain detailed and methodical observations, provide a forum for reviews written by actual users who can discuss the real-world experiences of someone who has spent their own money on a product. In addition, because user reviews are a valuable source of information, both pre- and post-sale, companies with an online presence such as Amazon, Best Buy and Yahoo have made it easier for consumers to have access to such user reviews on the products they carry by soliciting recent purchasers for their opinions and then making it easy for new buyers to quickly browse through the comments of past purchasers.

At the same time that the internet continues to expand as a ubiquitous resource, online tools such as "blogs", "wiki's", and a number of social media applications, such as MySpace, Facebook and Live Journal, are making it easier for consumers to create online content without the need to understand the arcane process of coding web pages in HTML. These sites have become recognized as a legitimate source of news, opinion and information and, as a result of these tools, and the proliferation of these sites, user-generated content of all kinds is expanding at a rapid rate across the internet.

However, while the growth of user-generated content, in theory, ought to be very useful to anyone doing product or service research, since more data should mean a greater likelihood of finding a relevant discussion or review about a particular product or service, this is frequently not the case since, as noted above, the information being sought is commonly dispersed across multiple web sites having different interfaces and employing different online search tools. This diffusion of source and lack of uniformity in interface ultimately makes it difficult to find all or even most of the relevant content and, frequently makes it virtually impossible to skim though and understand relevant reviews quickly, assuming they can even be located, resulting in a degradation and frustration of the entire decision making process. In addition, the foregoing process can be complicated even further when trying to search for relevant user-generated comments or reviews narrowed or filtered on the basis of a specific personal or lifestyle preference.

The challenge of searching user-generated content can be better understood by examining the services of Google®, one of the best known generalized search engines. Google employs a key word search paradigm that is familiar, and therefore easily used by most casual users. While Google is effective when searching for websites on the basis of a few key words, for example a search for a particular topic, such as "the history of hats", or a recipe for "mom's apple pie", Google is less useful when searching for user-generated content, such as non-professional reviews, which may be embedded deep within a larger website. This is due to a number of factors that cannot be easily controlled. First, the "signal to noise" ratio for user-generated content tends to be very high due to the unstructured way in which many non-professional writers write, and as such, simple key word or phrase searching without extensive Boolean manipulation frequently results in a large numbers of "hits" that don't contain truly relevant information. Second, it is well understood that in order to solve the problem of how to best rank and present relevant search results, search engines such as Google create an index of websites and, associated, relevant pages returned, and then rank order these results based, in part, on the number of sites 'linking back' to a particular result, with a greater the number of links "back" indicating a more 'relevant' result, and therefore, a result which should be ranked more highly.

One problem when such a system is applied to user-generated content is that, for the most part, user-generated reviews will not point to each other, but will instead generally stand on their own, resulting in relevant search results being "buried" many pages down from the "top rated" results. Another problem is that the linking process is time consuming, resulting in a delay, perhaps as much as a month or more, before search indices are refreshed, rendering search results out-of-date before they are even available. Additionally, user-generated content is frequently less well focused than professionally generated content, so that a single entry in a blog, for example, may cover many different and disparate subjects, none very deeply, with the result being lots of 'search hits' without dislodging much useful information.

Google has attempted to address these problems by creating a second search engine currently known as blogsearch.google.com, but this is not always a convenient solution, since it obligates a user to visit multiple search engines in order to find desired results, and, regardless, does not address the "signal-to-noise" problem described above. As may be understood, as the universe of user-generated content grows, the "signal to noise" problem again becomes a significant factor, and extracting relevant user-generated reviews on a narrow topic in a specific domain of interest becomes unreliable at best.

Accordingly, the need exists for a specialized method and system that specifically addresses the problem of how to easily analyze user-generated content, in various forms, relevant to a particular topic, or related group of topics, and then provide the ability to search within this defined group, presenting a searcher with the most relevant information. In the context of current invention, relevant information can be thought of as, a) general sentiment indicators on a specific attribute for the product or service from all the reviews, b) a summary, or "gist", of most relevant aspects from all user comments, condensed into an abstract that can help the searcher understand the condensed conclusion of the relevant reviews, enabling them to make a decision without the need to read through all the reviews, c) location indexed information to enable a user to easily narrow down choices their choices based on geography, and d) personalization of content, user interface and access technologies and portals (internet, phone, iPod, etc.) that enables a user to extract information based on their own customized "profile".

BRIEF SUMMARY OF THE INVENTION

The invention is directed to a method and system for capturing, extracting, analyzing, categorizing, synthesizing, summarizing and displaying, in a customizable format, both the substance and the emotion, or sentiment, embodied within user-generated content, including but not limited to user-generated comments or reviews written by non-professional reviewers, collected from across multiple sites on the internet and/or accessed from preloaded databases.

The invention comprises a mechanism to collect content and build a database of user-generated content, such as the aforenoted user-generated reviews, which may be extracted from sources indexed to a local business, service, product or other real entity. The collection mechanism may further comprise a semantic crawler to collect content located at different sites on the internet, gathering information about businesses relevant to a database associated with a particular topic or interest, such as food, with the crawler acting to update such information on a regular basis.

A sentence parser and tokenizer extracts sentences from each review stored in the review database, and tags each sentence with an indication of its 'part of speech', such as noun or adjective, prior to passing the sentence to semantic processor. The semantic processor uses both heuristic databases and scoring algorithms to generate a score for each relevant sentence. The semantic scoring algorithm extracts all key aspects of a user review associated with a particular business or service, and generates a single score for each pre-defined core attribute, such as price or service. A synopsis generator uses both relevant fragments and complete sentences, which are semantically tagged, to generate a summary from all the reviews collected in order to provide a searcher with results that include both substance, such as facts and figures, and sentiment, such as feelings, and which are then formatted in an easy to understand way in order to present the search results in a logical and quickly accessible manner. Using the invention it is possible to search for, capture, extract and present the kind of information and advice that would traditionally be passed along by word-of-mouth.

BRIEF DESCRIPTIONS OF THE SEVERAL VIEWS OF THE DRAWINGS

For a fuller understanding of the invention, reference is had to the following descriptions taken in connection with the accompanying drawings, in which:

FIG. 3 is table illustrating the meta-level expansion of a series of domain specific words in accordance with the instant invention;

FIG. 4 is a table illustrating a sample set of comparison phrases and their associated representations in accordance with the instant invention;

FIG. 5 is a table illustrating the prioritization of alternative meanings for the word "delicious" in accordance with the instant invention;

FIG. 8 is a table illustrating some sample words that may be used in the food or restaurant domain along with their ratings and sentiment qualifiers in accordance with the instant invention;

FIG. 10 is a table illustrating the distribution of ratings for "food" from all the semantically analyzed reviews of a particular restaurant;

FIG. 12 is a table illustrating the number of sentences relating to a particular core attribute that must be present before a synopsis can be generated in one embodiment of the invention;

FIG. 13 is a table illustrating a subset of the output of semantic extraction for a single restaurant;

FIG. 14A illustrates the top half of a web page generated in accordance with an embodiment of the invention.

FIG. 14B illustrates the bottom half of a web page generated in accordance with an embodiment of the invention, the top half of which is illustrated in FIG. 14A.

FIG. 16A illustrates the top half of a web page generated in accordance with an embodiment of the invention.

DETAILED DESCRIPTION OF THE INVENTION

Figure 1:
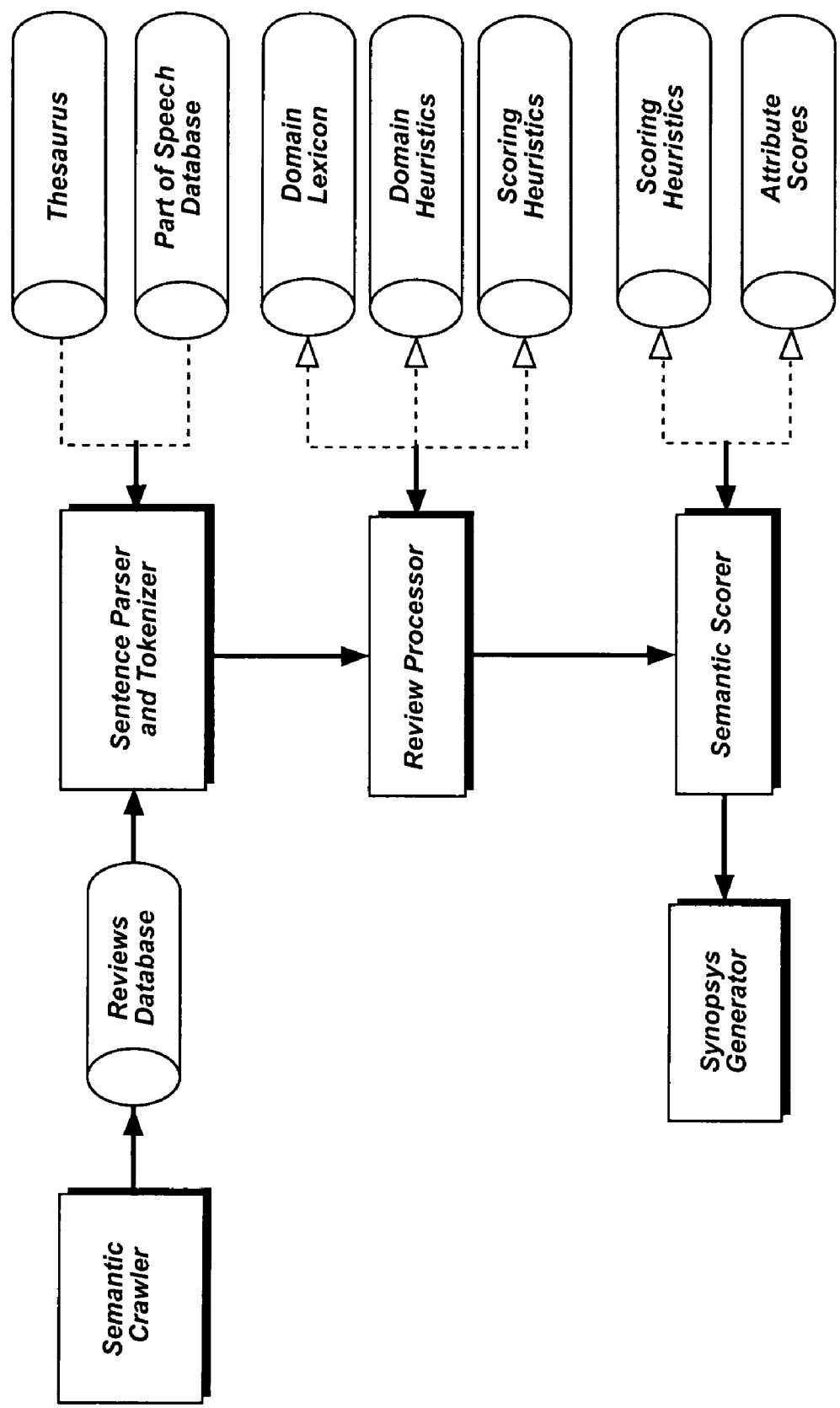
FIG. 1 is a block diagram illustrating the architecture of an embodiment instant invention.

In the detailed descriptions of the embodiments of the invention that follow, like reference numerals refer to like components in the various views, in which there is illustrated several embodiments of a new and improved method and system for analyzing user-generated content.

In addition, while the instant invention teaches a generalized method and system for analyzing user generated content that can be applied to various fields or domains of interest (such as shopping reviews, doctor reviews, film reviews, or any form of non-review-type user-generated content, etc.), the detailed description provided below will be in accordance with the domain of restaurant reviews, such as those that can be found on websites such as yelp.com or zagats.com, as well as in various newspaper restaurant review column archives, all of which are popular search destinations, but which suffer from multiple limitations.

Referring first to FIG. 1, the architecture of the system components of an embodiment of the instant invention is shown. The main input to this embodiment of the invention is a database of previously collected reviews, though as noted, the invention may be generalized to any form of user-generated content, and is not limited to reviews. The reviews that form the database may comprise user-generated content either a structured or unstructured form. The database may also comprise a collection of text documents indexed such in a way that a semantic processor can initiate a process of correlating the content to an entity, such as a business or product.

As illustrated, the semantic crawler is an external component or mechanism used to navigate and gather reviews from web sites across the internet. At the pre-processing stage, all user reviews are indexed, or otherwise associated with a specific business or product or other real entity. For the purposes of disclosing the instant invention, an entity such as a restaurant will be used, however, as noted above, this is by way of example, only, and shall not act in any way to limit the application of the inventive method or system to future concepts.

Once the reviews are indexed and available for processing, a sentence parser and tokenizer extracts sentences and tags from the reviews for processing by a semantic processor that then makes use of heuristic databases and/or scoring algorithms to score each relevant sentence. The semantic scoring algorithm extracts all key aspects of those user reviews associated with a particular business or service, such as a specific French restaurant, and then generates a single score for each of core attribute (service, ambiance, etc). The synopsis generator uses relevant sentence fragments and complete sentences that are semantically tagged to generate a brief summary culled from all the reviews for a particular establishment. Thus, the summary format is both user-friendly and internally comprises a logical flow of information.

In the context of the present invention, reviews are generally one of three types; professional reviews posted by professional writers who review products or services and publish their expert opinions, frequently in a syndicated form; user-generated reviews posted on either particular business or product websites or on websites that are dedicated providing a forum for non "professional" reviews; and comments to either of the forgoing, often providing additional information, supporting opinions or rebuttal opinions to a more-formal "professional" or "amateur" review.

While the foregoing anticipates review will be found in dedicated spaces, such as a newspaper's weekly restaurant review page or a website dedicated to camera reviews, reviews can also be found within personal blogs taking the form of either formal reviews or unstructured comments about a specific product or service written in an entry that may also discuss other non-relevant aspects within the same entry.

For the purposes of the invention, all of the foregoing are broadly referred to as "reviews" unless explicitly identified by the specific category. In addition while, at the present time, reviews, including reviews found in blogs, are primarily comprised of text and images, the invention can also be adapted to include audio and video podcasts, other online audio and video and other multimedia forms of user-generated content as part of the reviews database. For example, there are a number of services in operation, some manual and some automatic, which transcribe the content of podcasts and other web audio and video, and these transcriptions can easily be added to the database. There are also visual search engines, such as like.com from Riya, which can be used to supplement the database in connection with image searching.

Turning, then, to the actual content, all reviews in their most common form can be described as collection of sentences. Sentences are small coherent units of text and are the most fundamental building blocks of information used to infer sentiments, including positive and negative feelings and emotions, about whether a reviewer experiences positive, negative or neutral feelings within a particular domain context. In the case of more informal review, such as "user reviews", but also occasionally in the context of professional reviews, an incomplete sentence, slang or local idiomatic expressions may also be used to imply, and thereby infer, sentiment. Using standard rules of grammar, each review is parsed into sentences using common delimiters such as "a period followed by a space", "a question mark followed by a space", "a ')' followed by a period followed by a space", etc. Each sentence is then tokenized to extract individual words. In this manner, an iterative process of grouping collection of words into individual words and named-entity phrases into recognizable tokens and tagging them as common words is performed.

Figure 2:
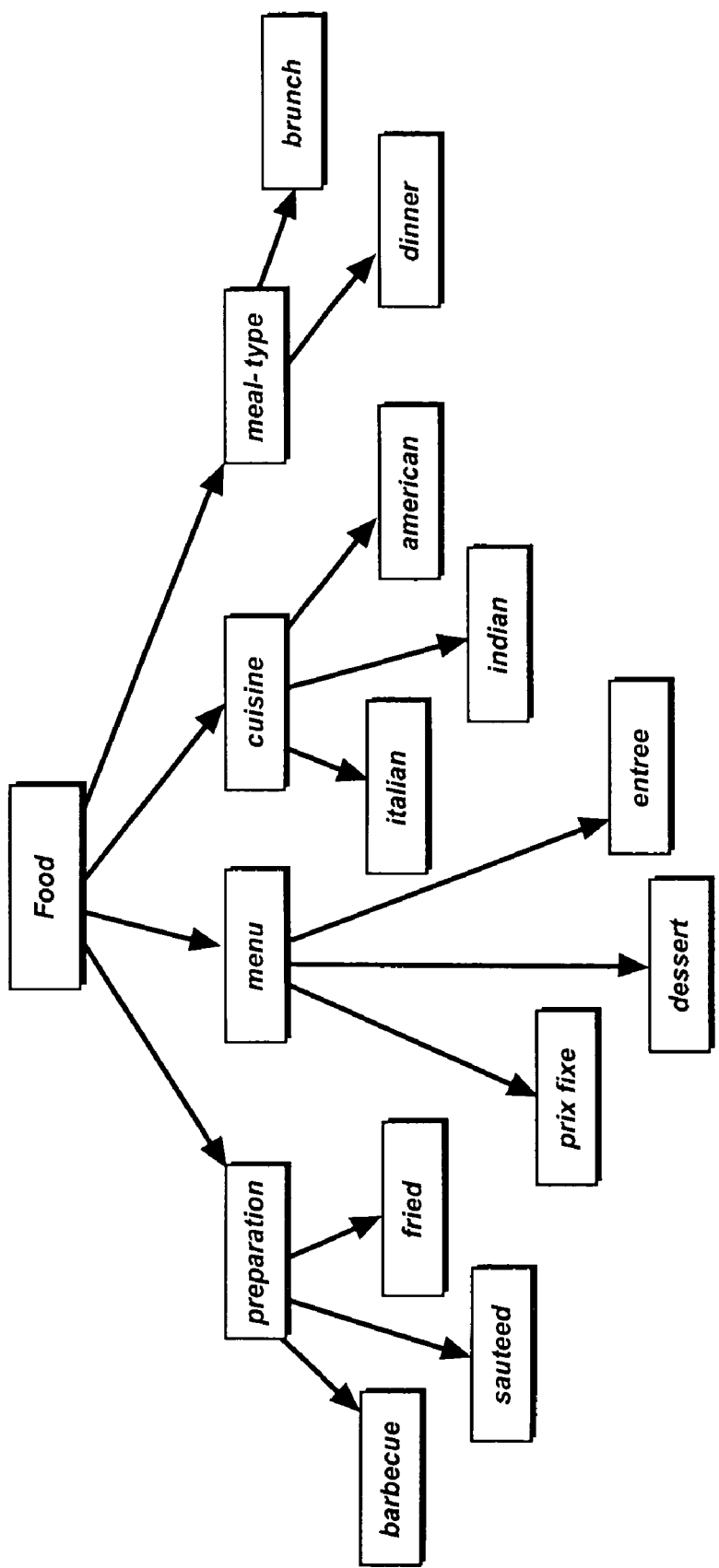
FIG. 2 is an illustration of a sample word category group for the word 'food' in accordance with the instant invention.

Referring next to FIG. 2, the method and system of the invention used in the categorization of common nouns, verbs, and other parts of speech into word category groups, for the purposes of natural language extraction and understanding, is shown. As can be seen in the illustration, this association is designed to establish a semantic association from a given collection of words, and enable users to perform queries based on corresponding associations. By way of example, a simple word category group tailored to the exploration of food is shown in FIG. 2. As can be seen, the top level category, "Food", breaks down into a number of elements such as "cuisine" or type of food, "meal-type" which associates to a particular time of day, such as breakfast, lunch or dinner, "menu" element, which links to a part of a traditional meal, or the whole meal in a prix fixe, and "preparation" which can frequently be sought after, apart from a particular cuisine. The example shown in FIG. 2 is illustrative, only, as the associations are not fixed, and can be expanded to comprise a wider group of categories as well as additional levels of distinction.

In practicing the invention, similar word category groups are established for each core attribute that is distinguishable for a particular domain. For example, with respect to restaurant reviews, in the food and dining segment, the four most common core attributes for the domain may be selected to be:
  Food
  Service
  Ambiance
  Price Sample assignments of such core attributes can be see in FIG. 3.

As the implementation of a particular instantiation of the instant invention evolves, additional conceptual relationships can be established within various individual categories. This expansion will then enable meta-level queries by an end user such as:

"Italian restaurant offering 'prix fixe' menu for Sunday brunch."

Such expansion can be seen in FIG. 2 where a sample of Food, Service, Ambiance and Price categories and associated words is shown.

It is important to note that the sample query provided above, if run through a general search engine such as Google, would likely yield results for keywords that match "Sunday brunch", "brunch", "prix fixe" etc., but would not be likely to provide any useful results, even with the use of extensive Boolean modifications. In addition, passing the same query through Google Local Search, currently found at "maps.google.com", with a starting location of "Berkeley" yields restaurants in San Francisco, more than 10 miles away, a distance that does not really fall within the accepted concept of a Berkeley neighborhood, and also yields additional results that are equally irrelevant. The challenge such systems face is in prioritizing keywords and parsing meaningful dependent words from a vast database of unfiltered keywords. On the other hand, the system taught by the present invention is able to identify "Italian" as cuisine type, is further able to identify restaurants that serve "brunch" on Sundays, and then identify keywords such as "prix fixe" either in user-generated comments or any other attributes associated with a particular restaurant.

Another example of an advantage of the instant invention over a generalized search engine can be seen by way of the example query for "dim sum in Palo Alto". A search on Google Local for "dim sum" and "Palo Alto" returns restaurants that have the keywords "dim sum" either in the restaurant name field or "dim sum" in the user comments, neither of which is a useful way to prioritize the order of results. In addition, since keyword based systems are unable to distinguish between reviews that have "worst dim sum in Palo Alto" vs. "best dim sum in Palo Alto" a restaurant that has the "worst dim sum in Palo Alto" may well show up as the first result when searching for "dim sum in Palo Alto". The instant invention overcomes such issues and provides more meaningful and relevant search results to end-users.

Finally a semantically aware system based on the teachings of the invention can be used to respond to user queries such as "Find a restaurant like Evvia", where the system may incorporate the context of the current location, possibly based on the GPS coordinates from a cell phone or explicit user input. The system may also have prior knowledge of the restaurant "Evvia" in Palo Alto, Calif., either from user settings or usage history or a semantic match to a restaurant name or other attributes. As a result, a query such as "Find a restaurant like Evvia" is very useful for a traveler visiting a new city, e.g., Chicago, Ill. or Atlanta, Ga. who wishes to use a known, and perhaps favorite, restaurant as a reference for their search.

Figure 6:
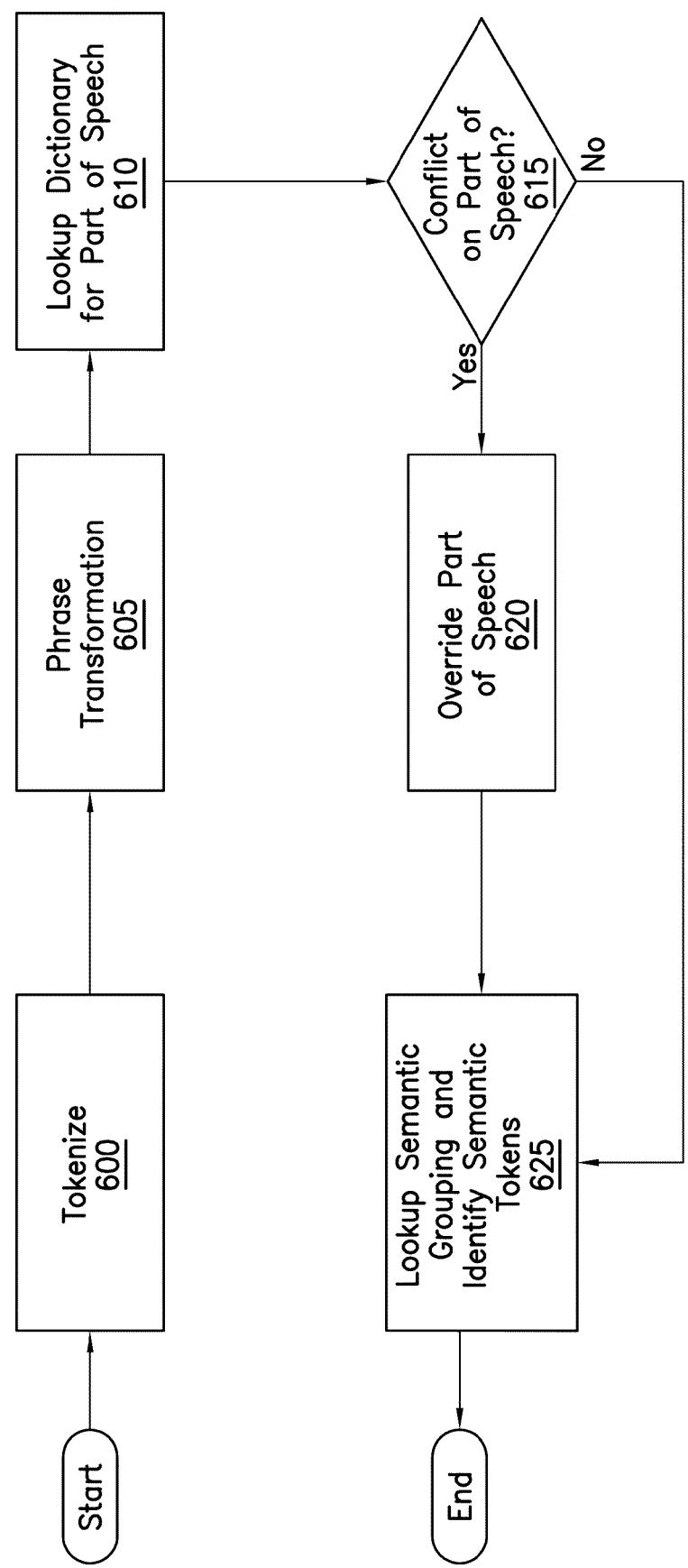
FIG. 6 is a flowchart illustrating the tokenizing and tagging process of the instant invention.

Referring to FIG. 6, a basic flowchart illustrating the teachings of the invention in connection with the tagging process is provided.

For the system to extract meaningful semantics from individual reviews, it must correlate tokens, contained in each extracted sentence, to identifiable words found in at least one of the domain attribute categories associated with the group (i.e., STEP 600). For example the word "salty" must be found in either "Food" or "Service" or "Ambiance" or "Price". In tokenizing the sentences, the parsing algorithm also attempts to identify specific references to the comparison of one attribute to another or to the comparison of one entity to another. In STEP 605, such phrases are specifically transformed for semantic processing and sentiment analysis, and will be discussed in greater detail. Examples of comparison phrases and their associated representation can be seen in FIG. 4.

The invention may leverage off-the-shelf lexical reference systems and dictionaries such as the Princeton University WordNet®. The invention may also leverage public domain software such as JTextPro (http://jtextpro.sourceforge.net) for the purposes of sentence segmentation and tokenization, as well as the "part's of speech" tagging process described, also described in more detail, below. WordNet is a large lexical database of English of nouns, verbs, adjectives, adverbs etc. In one implementation, the invention can interface with WordNet directly, looking up various parts of speech associated with words directly from the WordNet database. In an alternative implementation, JTextPro provides a layer of abstraction and some added functionality such as phrase chunking, which helps identify if an adjective is associated with a noun phrase or a verb. JTextPro and many other systems rely on WordNet or similar databases to ultimately perform part of speech tagging and other natural language processing functions.

Returning to the invention, after tokenization, the system tags phrases and tokens with appropriate parts of speech. In STEP 610, Each token is queried in the dictionary. In STEP 615, the dictionary query responses are checked for conflict. In STEP 625, if no conflict is detected, the system proceeds to lookup semantic grouping and identify semantic tokens. In STEP 620, if multiple responses are returned for a token (i.e., conflict is detected), a token transformation process is used to override the responses returned in order to arrive at the most contextually relevant part of speech, before continuing to STEP 625. For example, "delicious" is commonly used token in dining vocabulary and a typical dictionary query response for the word "delicious" results in about 8 alternative combinations of parts of speech and priority. A chart illustrating the prioritization of alternative meanings for the word, "delicious", as returned by WordNet is illustrated in FIG. 5.

In resolving the conflict between competing "part's of speech" assignments for a word, the position of the particular token as subject or predicate, and/or the inclusion of extra words, is analyzed and a transformation to override the part of speech initially assigned may be applied. The common use of slang or grammatically incorrect sentences often breaks this rule and therefore, for most common conflicts, an override "part of speech" mapping database is maintained which determines which part of speech should be chosen. In addition, due to the often-informal nature of user-generated content, the parsing mechanism may be modified in accordance with specific domain heuristics in order to take into account a writer employing incorrect grammar, the use of slang or an informal lexicon, and other boundary conditions. For example, the use of the characters "w/" to represent the term "with", use of the characters "w/o" to represent "without", the use of the word "yuck" when used as an adjective, where it might otherwise be used as a noun or verb, etc., are all examples of such domain-specific adjustments that the invention may accommodate. The invention is also able to identify specific words that enhance, or dampen, the effect of such adjectives on the identified object(s), such as in the sentence, "The shaking beef was simply amazing."

Figure 7:
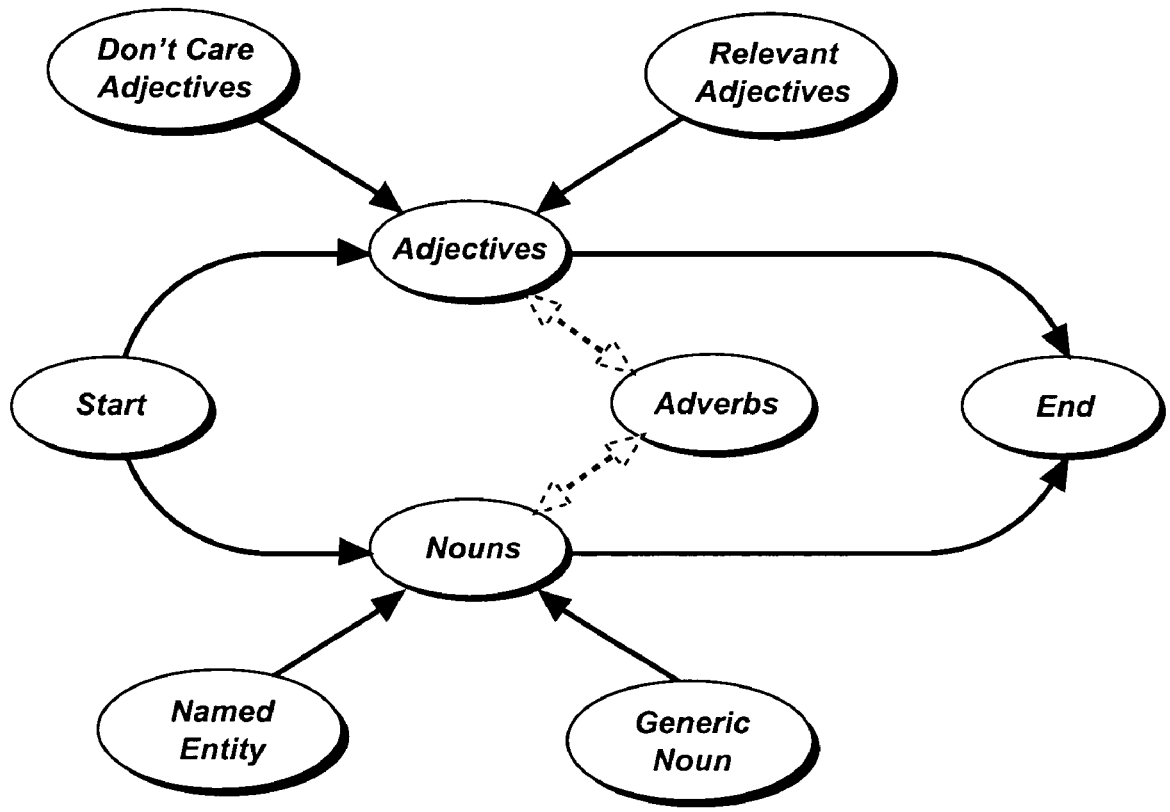
FIG. 7 is a state diagram illustrating the process taught by the instant invention to identify possible semantics within a sentence contained in a user-generated review.

Turning next to FIG. 7 a state diagram is provided to illustrate the process, taught by the invention, of identifying possible semantics within a sentence contained in a user-generated review. As can be seen in this example there are two transition paths that are possible: 1) a qualifying adjective that describes a named-entity only or a named-entity followed by a sequence of generic nouns; and 2) a named-entity followed by a sequence of adjectives that qualify it. It is noted that while only two paths are shown, it is anticipated that other combinations may be added by extending the support for additional state transitions.

Under the invention the semantic analysis process is a process of heuristically identifying tokens and then applying various token rules and modifiers in order to compute a score for each sentence, finally associating it with one or more category types. The system uses a basic sentence diagramming approach to processing user comments, but in the instant embodiment, interprets only limited parts of speech in order to reduce the amount of processing required.

By way of example, a user-generated comment "food was great" entered into an online restaurant review site, such as yelp.com, would be represented as a attribute-value pair in the invention (where the symbol "≡" means "equivalent") as:

$$AV_i \equiv (GROUP(food), ADJ(great))$$

Where GROUP(food) indicates that token belongs to "food" category, and

ADJ(great) indicates great is a rated adjective in the vocabulary

For a comment such as "food was great but pricy", the attribute-values are represented as $$AV_i \equiv \{(GROUP(food), ADJ(great)), (GROUP(food), ADJ(pricy))\}$$

In a more complicated case such as "food was great but not so pricy", the attribute-values can be represented as $$AV_i \equiv \{(GROUP(food), ADJ(great)), (GROUP(food), F_{Rule}(ADJ(pricy)))\}$$

Where $F_{Rule}$ is a heuristic rule that influences the rating of ADJ(pricy)

As can be seen, the system employs an approach of scoring individual sentences rather than rating an entire review. This allows for a more precise sentiment analysis and summary generation. A rating is primarily associated with those adjectives that align with choice of words people generally make when writing reviews. While the adjectives are not tied to any domain and hence extensible as and when new domains are added to the system, it is still helpful to employ a manual validation of the use of such adjectives when new domains are added to the system. For example, in the process of bootstrapping a new domain, such as restaurant reviews, an initial list of adjectives and associated ratings is created based on extensive textual, semantic and demographic analysis of choice of words used in writing various reviews. A chart illustrating some sample words along with their ratings and sentiment qualifiers is illustrated in FIG. 8.

In the process of rating a sentence, the rating system is used in conjunction with a heuristic algorithm to address common qualifiers for adjectives and tokens that are deemed relevant. By way of example:

$F_{Rule}$ is an element of $\{F_{Negation}, F_{Accel}, F_{Decel}\}$, where:

$F_{Negation}$ is a rule that covers those cases where the use of a phrase/word means exactly the opposite of the original meaning. E.g. "This is a good place" vs. "This is not a good place"

$F_{Accel}$ is a rule that covers those cases where the use of a phrase/word emphasizes the intent of the adjective used in the review. E.g. "This is a good place" vs. "This is a very good place"

$F_{Decel}$ is a rule that covers those cases where the use of a phrase/word illustrates a sentiment not as emphatic as the one without it. E.g. "This place is pricy" vs. "This place is a tad pricy"

By using the forgoing, the score for a sentence can then be computed as follows:

$$F(Score_{attribute}) = Score(AV_i) \pm Score(F_{Rule}), \text{ where}$$

Score($AV_i$)=Score of Semantic Tuple from rating system lookup; and

Score($F_{Rule}$)=
($F_{Negation}$*NegationWt||$F_{Accel}$*AccelWt||$F_{Decel}$*DecelWt)

In the above calculations, NegationWt, AccelWt, DecelWt each represent a type of impact on sentiment due to the use of specific phrases.

It is noted that the process of associating scores with attribute-value pairs is not domain or subject matter specific, and so the rules for negation, acceleration and deceleration can easily be extended to apply to other domains. For this reason, adjectives are generally not tied to any particular domain. However, the system is extensible, and if necessary, specific adjectives or scoring preferences that change from domain to domain can also be accommodated.

Using the process disclosed above, sentence parsing, tokenization, semantic analysis and sentence scoring is continued for every sentence in each review in an exhaustive manner. The output of the process is then stored and used in determining the overall sentiment and most relevant summary from all the reviews. In addition, each review can, itself, be rated with a positive, negative or neutral sentiment using the same approach.

Figure 9:
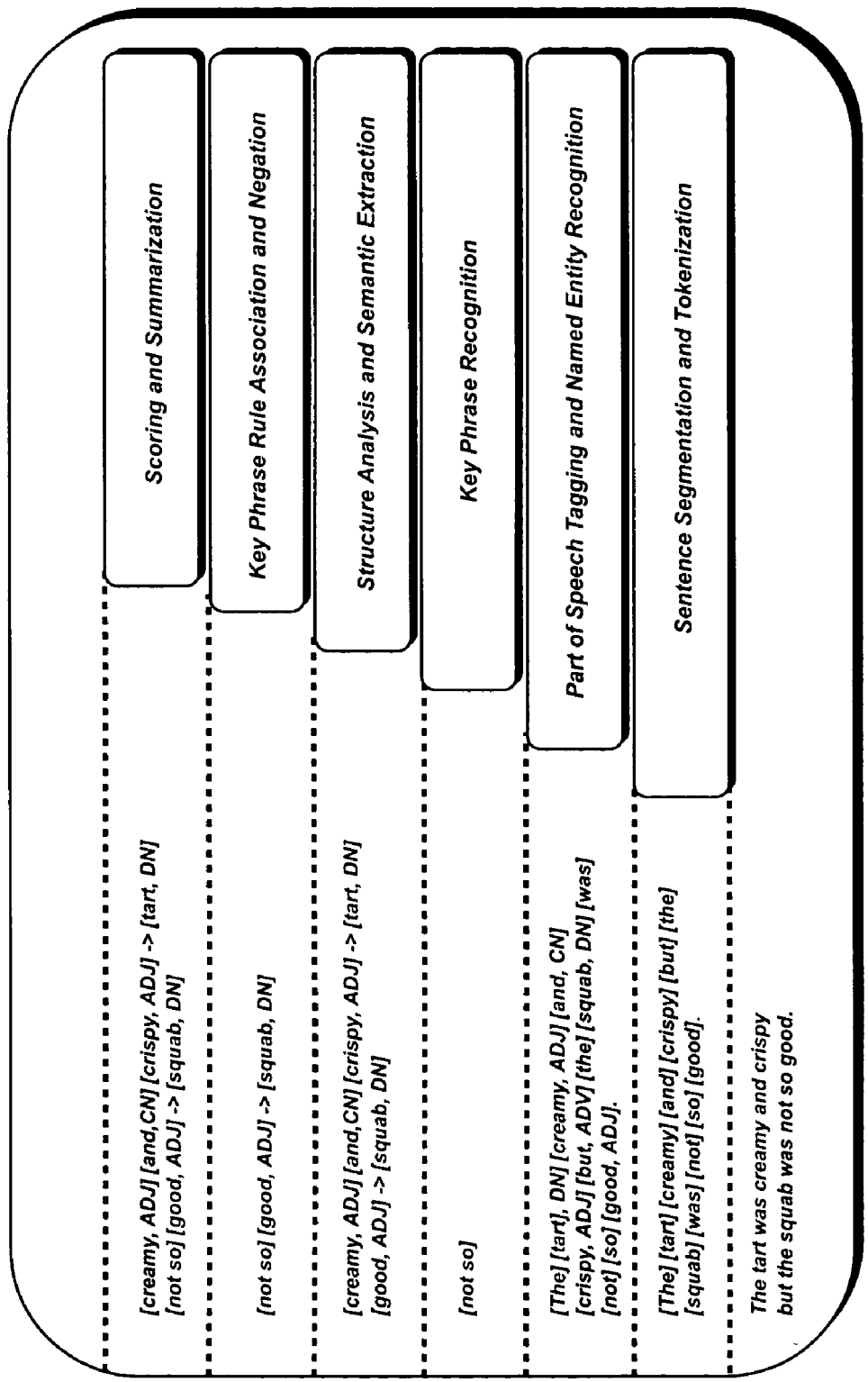
FIG. 9 is a hierarchical illustration showing the processing stages of a single sentence resulting from tokenization through summarization in accordance with the instant invention.

Referring next to FIG. 9, a summary "bottom's-up" representation of the process taught by the invention is illustrated. As can be seen, a sample sentence, "The tart was creamy and crispy but the squab was not so good" is first extracted from a user-generated review. Upon extraction the sentence is passed through the tokenization and named-entry recognition stage where the words "tart" and "squab" are identified as domain words within the restaurant/food review domain. A "key phrase recognition" stage extracts the words "not so", and the sentence is then passed to a part-of-speech tagging phase where common words, connective words, adjectives and nouns are tagged. At this point it is possible to recognize that "creamy" and "crispy" are associated with tart, while "good" is associated with "squab". However, in light of the fact that the key phrase recognition phase has also identified the phrase "not so", the same association is applied to the description of "squab" so that a positive sentiment of "good" is downgraded in score by the qualifier "not so" good. Finally, a semantic interpretation of the sentence is generated indicating that the tart was "creamy and crispy" while the squab was "not so" good.

As can be understood, sentiment attributes are domain specific and chosen based on an understanding that within a particular domain such sentiment attributes are commonly used to quantify one's subjective experience. For example, in rating a restaurant, people generally use the parameters of food, service and ambiance to express their dining experience. A statistical mode of the scores of each of the sentences identified for a particular restaurant from various user reviews can be computed for food and service attributes. Adjacent sentiment scores that are significant in number are then processed and either added to, or subtracted from, the statistical mode score in a weighted fashion to compensate for reviews that may have been rated differently from the statistical mode score, providing a mechanism for 'normalizing' different reviews from different reviewers each having different base expectations.

By way of example, referring to FIG. 10, if the distribution of ratings for "food" from all the semantically analyzed reviews is distributed in the illustrated manner for a particular restaurant, for example, "Rob's Grill", then the score for the food attribute for "Rob's Grill" as shown in FIG. 10 can be calculated as follows:

$$\text{Score(food)} = 8 + 8/(23+8+14)*(9-8)-(14)/(23+14+8)*(9-8)$$

And so:

$$\text{Score(food)} = 7.86$$

Although optional, and adjustable for any particular domain, in the provided example the scores for Score 5 & 6 are dropped, and not included as relevant, since they fall below a predefined threshold.

Similarly, for each attribute, scores from various sentences associated with different reviews are processed and a corresponding final score for those attributes is computed. These final scores provide a quantitative representation of subjective user experiences as expressed in those reviews.

Based on the foregoing, a generalized algorithm for deriving a single score representative of the food, service and ambiance of a restaurant can be written, with the following algorithm used to derive sentiment for food, service and ambiance for a particular restaurant:

$$S_{Restaurant}(\text{attrib}) = S_{Mode} \pm (\Sigma_i (\Delta_{adj(i)})^{k} * (\Delta_{distance}))$$

Where $S_{Restaurant}(\text{attrib})$=Sentiment score for the attribute, attrib, for a restaurant
$S_{Mode}$=Statistical mode of all the scores for attribute, attrib
i=Number of scores within x range of $S_{Mode}$
$\Delta_{adj(i)} = \Sigma S_i / \Sigma S_{All}$
$\Delta_{distance} = S_{Mode} - S_i$
$\Sigma S_{All}$=Count of all relevant scores
Where "attrib" can refer to food, service, ambience or price.

Figure 11:
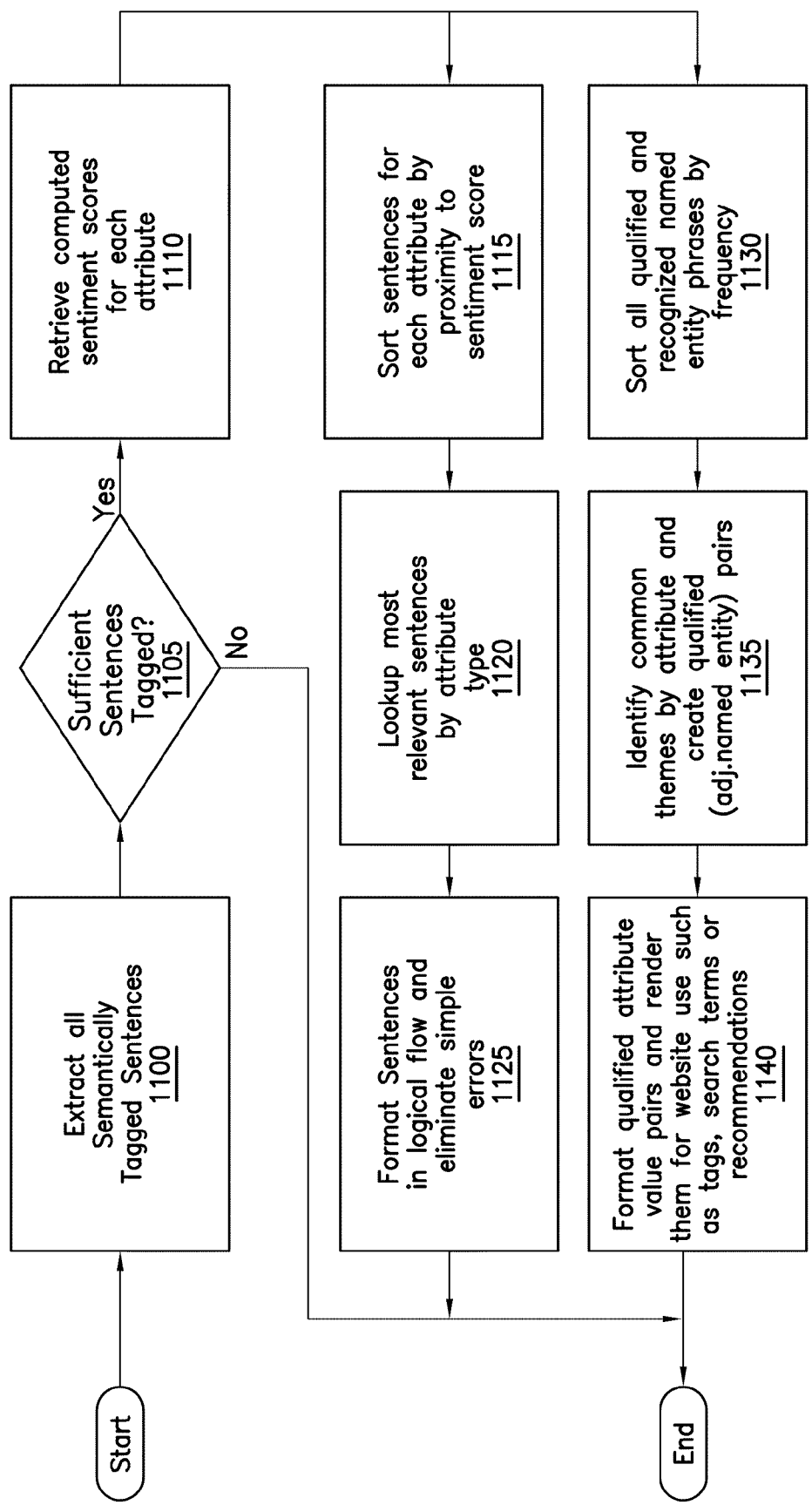
FIG. 11 is a flowchart illustrating the process for generating a synopsis for a particular restaurant from individual sentences that have been semantically scored.

Referring next to FIG. 11, a flowchart illustrating a process for generating a synopsis for a particular restaurant, based on individual sentences that have been extracted from a review and semantically scored, is shown. In STEP 1100, all semantically tagged sentences are extracted in accordance with teachings of the invention, as described above. Once completed, in STEP 1105, the number of sentences tagged is compared to a predetermined threshold that has been chosen to make sure that any 'noise' will not affect the final score. If that threshold is met, in STEP 1110 the synopsis process retrieves the computed sentiment scores for each attribute.

The next step (STEP 1115) is to sort all the sentences tagged and scored according to their sentiment score. In STEP 1120, the number of sentences are looked up by attribute. Finally, in STEP 1125, the semantically tagged sentences are arranged for display in accordance with basic grammatical rules. The number of sentences relating to a particular core attribute such as food, service, etc, that must be present before a synopsis can be generated is predetermined and a sample chart illustrating such parameters is provided in FIG. 12. STEPS 1130, 1135, and 1140 may be performed as an alternative to (or in parallel with) STEPS 1115, 1120, and 1125. According to the chart illustrated in FIG. 12, heuristic rules can be used in generating a synopsis for each restaurant, provided there are a sufficient number of different reviews and a large enough number of different sentences have been semantically tagged, with the synopsis generation using the lookup table to generate a relevant restaurant domain specific summary.

As illustrated in FIG. 12, if the cost attribute is embedded in another sentence that has been identified for inclusion in the summary, then no explicit reference to the cost will be made. As a result, in many cases, where service or ambiance may not be explicitly referenced in reviews, the summarization process will ignore those attributes. The final compilation is then rearranged by altering the order of the sentences in a manner to allow them to be read naturally, smoothly and logically.

Before continuing, it is noted that the actual weighting of the algorithm, as well as the possible introduction of external factors, apart of user-generated content, for each domain will depend on the particular domain. Continuing our restaurant example, if a restaurant is listed on "Open Table", a site that permits making online reservations for many different restaurants, then we may infer certain things about the ambiance of that restaurant, since there is a fee associated with an "Open Table" listing, so "Open Table" is not likely to list either a "fast food" or "family style/no reservation required" restaurant. It is anticipated that such "external" data, or factors, can be employed when developing a weighting strategy for each domain, and that a "domain specialist" knowledgeable within an industry or community can establish such external weighing factors.

Therefore, considering all of the foregoing, and applying the methodology and system of the invention disclosed herein, a detailed examination of an exemplar search for a particular type of restaurant experience in accordance with the invention will now be described.

As discussed, in the described embodiment of the invention, a preparatory step of content extraction is performed. During this step a semantic crawler visits targeted websites and retrieves content relevant to each restaurant. For any individual restaurant there may be as many as 100 reviews collected from a dozen different websites. Sites like Sfgate.com or SanFran.com may provide a professional review of the restaurant while websites like yelp.com, city search.com, and Tripadvisor.com may contain user-generated reviews. There may also be reviews gathered from "food-fan" bloggers such as becksnposh.com or shortexact.com. For the purposes of this illustrative example it is assumed that the extraction process has located 10 professional reviews, 70 user-generated reviews from food-specific websites, and 20 user-generated reviews from blogs and other sources. This collection provides a fairly diverse set of reviews and enables the invention to analyze and provide sentiments and scores that can be customized for presentation to a broad audience.

In practice the system begins by picking a restaurant and retrieving all the reviews as well as all the other complete content associated with such reviews and the particular restaurant. The system then processes each review at a high level, with the first step in such processing being "sentence identification", the process used to break up a review into individual sentences in order to be able to extract the substance and user sentiment. So, during the first phase of the invention, one goal is extraction in order to answer the question, what is a reviewer thinking when they write a particular phrase, or sentence fragment, and is it an expression of a feeling, an exclamation, hyperbole, a formal sentence, a score, etc.? Each of these elements is tagged while processing the first pass of each sentence, and this is partly done through tokenization and key phrase matching, utilizing a string compare process as well as semantic comparisons of the extracted phrases to the previously identified domain vocabulary.

The next step in the first phase is to identify "domain nouns". "Domain Nouns" are words or phrases that recognize the relevance and importance of identified token within a sentence. As the vocabulary for a domain grows over time, more semantics are extracted from user-generated content, resulting in an iterative process. In other words, while initially, a predefined vocabulary may be established by domain experts, as new reviews are processed and tokens identified that do not have a "hit" or match against predefined vocabulary and also do not register a hit against any other parts of speech, they will be marked as exception tokens. Based on the frequency and contextual relevance of such exception tokens, they may well "bubble up" to a point where they can be fed automatically to the 'domain noun' collection. By way of example, in the sentence extracted from a review, "This place serves the best Kobe beef in the South Bay", 'Kobe beef' and 'South Bay' would be tagged as a 'domain nouns'.

In the second phase of the invention, we then try to associate every one of the untagged tokens with a part of speech from a dictionary/thesaurus. Typical parts of speech that are of interest are adjectives, nouns, verbs and adverbs. At the end of this process, each sentence has tagged tokens that may be used in connection with additional processing.

So, the initial sentence, "This place serves the best Kobe beef in the South Bay", would then be parsed into 'place', 'best', 'Kobe beef', and 'South Bay' tokens and marked appropriately as 'NOUN', 'ADJ', 'Domain Noun', and 'Domain Noun' respectively. It is also possible that 'Kobe beef' may not exist in the initial vocabulary, in which case only 'beef' would be flagged as 'NOUN'. As noted above, over time, for this particular restaurant, if the phrase 'Kobe beef' is found in multiple reviews, it will "bubble up" in the frequency table and ultimately become part of the domain vocabulary.

Once the process of tagging is complete, the next step is the semantic analysis and extraction of each review. The process of the invention iterates through the collection of sentences performs the following steps:

The first step is the process of attribute tagging. Each domain will have natural attributes that people use in rating a particular entity. For example, in the restaurants business, food, service, ambiance and price are all well recognized attributes. However, many people don't choose restaurants simply on the basis of one or two criteria, instead there are of the other subtle aspects that play a key role in the selection process and aspects of traditional "word of mouth" concept will frequently come into play. For example, people often say "this is a great place"

If we parse this simple sentence we arrive at:
This is
Is a
  A great
    Great place Based on these possible word combinations the sentence could be used in domain attribute tagging as a general reflection of sentiment, not saying in particular if the food or ambience is good, but rather simply an emotional expression.

So we conclude that we should tag how many user-generated reviews use the phrase "great place" so it can then be used as a social indicator, and this will then be available during the process of domain attribute tagging.

As indicated, one of the key aspects when building a broader semantic understanding of user-generated content is the mapping of "domain nouns" to "domain attributes". For the initial seed vocabulary used when a domain is first established, this vocabulary may be hand generated, but there are also automated approaches such as "domain clustering" that may be used in building a semantic map of nouns and corresponding attributes for a given domain.

After semantic analysis and extraction, the next step is semantic scoring. The invention relies on treating each sentence within a review as the basic building block. So, similar to domain nouns, we also seed an "adjective sense" scoring matrix during the initial establish of the domain. For each domain, approximately 500-1000 adjectives are rated and predefined. A domain specialist, or analyst for each domain typically performs this task. This step aids in permitting the rating of different domain aspects relative to each other. For example, if we assign "great" an adjective score of 8, and we also know that "outstanding" is generally considered to be better than "great", then it will also be assigned a score higher than 8. The initial seeding approach takes the most commonly used adjectives that describe elements of the domain and assigns absolute scores to each that are also in proper relation to each other, an important part of semantic scoring.

For example, the sentence, "This is a great place for Chinese food" will be assigned a score of 8/10 (assuming our adjective rating for "great" is 8), will be assigned a cuisine type of "Chinese" and will be put in the "food" domain attribute category.

It should be noted that it is not necessary to define a score for every adjective that can be used in semantically scoring text. Instead, the invention uses a novel concept of looking up equivalent dictionary and thesaurus words that reflect meanings similar to the adjective in question and then make a substitution by looking up an appropriate adjective that is pre-rated. By using this approach, the limited adjective vocabulary that is used in a domain may result in a fairly comprehensive "hit score" for key sentences for each review while reducing the amount of processing necessary for each sentence.

Continuing, in the process of actually assigning scores to the correct "domain nouns" and "domain phrases" the invention takes advantage of the basic principles of sentence diagramming.

For example, the sentence:
"This is a great place and the food is good"
is diagrammed as:
"great→place" [conjunction] "food→good"

Each sub-segment is scored independently but has the same sentence reference.

So for the above sentence, "great place" (a sentiment aspect) is rated 8, while "food" may only be rated 6 or 7. In essence, the system is able to infer that the place has a good "vibe" but the food is not at the same level.

Referring to the next sentence: "I liked eating the kung pao chicken here", the invention processes and identifies "kung pao chicken" as a menu item and matches the sentiment with—good—for a score of 7. This process continues for every sentence of the review, however not every sentence is clear and straightforward. For example, the next sentence has a slightly more convoluted structure:

"This is not a good place".
The process taught by the invention goes through a similar analysis as illustrated above, but also identifies another adjective heuristic. Generally, the invention defines adjective heuristics as rules that apply to adjectives and that modify the scoring of a sentence based on context. This is a useful variation as it provides a way to address complex conditions as:

This place is rarely not good
  The food here is tad pricy
  Service is not good
  Service is not so good As can be seen in the above examples, each of them semantically express an idea that can be extracted through straightforward scoring. Using the teachings of the invention we recognize such patterns as "key phrases" during first pass of token tagging, and the heuristics defined in the system can be used to process and score each the first example sentences above as follows:

"rarely not good" matches both a) [rarely not] good and b) [rarely] [not] good

But they both appear as different modifiers, [rarely not] as an "Accelerator" which enhances meaning, and [rarely], [not] as a "Flipper", which reverses meaning. Based on the precedence, option (a) would be chosen as the better match for meaning, and a corresponding "accelerator" rule would be applied to increase the basic score of the word "good", perhaps chosen to be a 7, to either 8 or 9 depending on the weight associated with "accelerator".

This process is repeated for every "domain phrase" before assigning a complete score to the sentence.

While the invention may process "user-generated" comment sentences in order to extract a sentiment about a restaurant, the same process can also be used to rate an entire review as having either a positive or negative sentiment. However, the granularity of such score can be refined to be more than simply "positive" or "negative" as, generally, while no user-generated review is likely to be detailed enough to rate food, service and ambiance altogether, some professional reviews, and reviewers, do provide such a level of detail and can be rated accordingly.

As noted above, the type of analysis conducted by the invention generally helps extract true sentiment from what an individual has written, and how they feel, about a particular restaurant as opposed to just assigning a random rating, and this adds both usefulness and credibility to the score that is assigned to a restaurant, especially when compared to traditional review sites on the internet.

For example, on Yelp.com, a restaurant user review site, an entry may give a restaurant a 5 star rating, but when you read the review you learn it isn't about the restaurant or its food, but instead about some ancillary matter, like how the person who parked their car treated the reviewer. Under the process taught by the invention, such a review would yield a score 0, so the scoring paradigm of the instant invention may be quite useful compared to methodologies that simply gather user input and permit the user to assign a rating.

Further, by analyzing user sentiment in accordance with the invention, key patterns in demographic behaviors may also be identified, and these patterns can be used, inter alia, to provide detailed analysis and reports to organizations interested in tracking consumer sentiment for the purposes of credit rating, customer satisfaction, pricing, loyalty, loan approval, etc.

By way of example, professional reviewers consistently rate the 'French Laundry' in Yountsville, Calif. as a 5 star restaurant. It is certainly widely acknowledged to be a very good and very expensive restaurant. However, when you extract the sentiment from user-generated reviews, the restaurant typically only scores between a 4.0-4.5, and not a 5.0, where one might expect. The primary reason for this is the fact that many people assign a "value quotient" to a restaurant and cannot justify, to themselves, giving it a 5.0 after having spent so much money the money. It's similar to the way that a high-priced ball player is—expected—to perform well, so the "bar" is raised higher, or in other words, when you spend a great deal for a meal your expectations can become altered, or multiplied and, as a result, you may become "hyper-critical". On the other hand, there are plenty of reasonably priced restaurants that may score 5.0 since, for those reviews and those restaurants, there is balance of the cost against the value attribute, which is clearly subjective. Accordingly, by using the system of the invention it is possible to extract subtle indicators and user/reviewer sentiments.

Having extracted each of the relevant aspects from a review, categorized these aspects according to domain attributes, and semantically scored each sentence for a specific restaurant, the next step is to generate an overall score for each attribute based on the individual sentence scores. This is a significant benefit of the invention since it provides the ability to extract what has been written in user-generated reviews, look at different dimensions discussed in a particular review (food, service, bathrooms, kid friendly, noisy, etc.) and extract at a multiplicity of phrases that can be grouped into the domain attributes of:

Overall Score
Food Score
Service Score
Ambiance Score

As a result of the scoring process practiced in accordance with the invention, no one individual reviewer can exert undue influence on the overall score. In addition, as mentioned above, during the semantic analysis phase, in addition to "domain attributes", other key elements of the domain are also extracted and made available for presentation to an end user. Examples of such attributes in the restaurant domain may include: bar, nightlife, kid-friendly, and parking. These and other attributes, such as the menu items served at the restaurant, the types of drinks available, the depth of the wine list, etc., can also be extracted from the reviews and made available as a searchable feature.

Returning to the process of the invention, once the attributes are collected, a normalization process may begin. Turning first to ambience, this domain attribute is a reflection of a person's 'feeling' about a restaurant and, for the restaurant domain model being used in this example, a part of what is understood to be factored into an ambiance rating is the domain attribute 'price', so the domain attribute of ambiance is affected by domain attribute of price. This interdependence is an important part of defining each domain and will be different for each domain. For example, if we consider an inexpensive restaurant, such a fast-food chain, not much money, relatively speaking, is spent on fixtures, etc, in order to keep food prices low, so the ambiance is not likely to be exceptional in any way. Conversely, if a restaurant has spent a lot of money on ambiance, they will also, generally, pay to have a good chef, experienced wait staff, etc. As a result, in such a restaurant if, at the end of an evening, the meal, per person, is in excess of $100, then the expectation that the meal will be "better than good" is much higher. So, in establishing the domain attribute of ambiance, one element that becomes a part of the rating for the ambiance is how much is generally paid for a meal, and we can, by way of example, establish a threshold that specifies that for a restaurant to have a rating greater than 3.5 out of 5 stars, the price of the meal has to exceed a certain dollar amount.

By supporting the association of different domain attributes in a manner that permits searching not easily accomplished through the usual Boolean search engine, the invention provides the ability to personalize both searching and the display of search results based on personal preferences. For example, a user may request top rated restaurants without consideration for price and that may provide a different list of restaurants than a query for "high end restaurants".

The process disclosed by the instant invention is also advantageous over traditional review sites that typically average all review elements together. For example, this is a problem with sites like TripAdvisor.com, which at its top level only displays a single "out of 5" score, and is also a problem when comparing expectations from different classes, types or groups of reviewers. For example, a domain customized to travel in accordance with the invention would be able to discern that expectations are different when it comes to accommodations comparing American travelers and European travelers.

Of course, some attributes are not domain specific. For example, service is generally understood to be an independent attribute. Therefore under the invention a statistical mode of all the user-generated comments is extracted as sentence scores are built and the invention computes an impact score from the distribution within some predetermined threshold and then either adds to, or subtracts from, the statistical mode. So, for each domain attribute there is an "expectation target", and for each domain there are both domain specific attributes and domain specific formulae, and finally, an overall score is built, in the current example, on a scale of 0 to 10. Using the example above:

8 people have rated the restaurant a 7
3 have rated it an 8
2 have rated it a 2

The invention may incorporate a standard deviation filter (around a chosen sigma, so that unusually low or high scores are eliminated, avoiding a "friend of the owner" or "disgruntled employee" phenomena). Then, once the individual scores for food, service and ambiance are computed, an overall score that takes a pre-determined weighting, for example 48% of food score, 26% of service score and 26% of ambiance score, can be calculated to arrive at an overall score. There may also additional "adjusters" that can be activated based on sentiment and other attributes. Further, if not all attributes are available, then some overriding heuristics can also be used to compute the final score.

One possibility presented by the invention is that an end user can adjust the search and result parameters based on their needs and specific profile. These may be configured explicitly, or the system may automatically make adjustments based user behavior and usage over time. For example, the system may recognize a preference in choosing a restaurant between one that is noisy but trendy versus one that is quiet but good.

As a result, the method and system of the invention has the ability to create a change in the paradigms of the marketplace by extracting substance and sentiment from reviews that are otherwise unstructured in nature, including blogs and RSS feeds that provide near real-time update on state of various entities. This information can then be used to trend various business just like stock tickers and provide valuable feedback and current information to people interested in, for example, the restaurant domain or appropriate groups in other domains.

In the broader context, the invention permits taking user-generated content and providing a Consumer Reports or Zagat-type equivalent review for smaller and local business. This facilitates the creation of a local search with smart listings of local business, providing not just contact information, but experiential information comprising the gist of user-generated comments, ratings and ability to interact with all this information, online, in a single place. This also facilitates employing user-generated content in the preparation of customized coupons or ads or other targeted communication by permitting the association and display of user reviews, or other sentiment information extracted by the practice of the invention, with advertising products to arrive at a customized piece, unique to a geographic area and, potentially, unique to a particular user.

In addition, as professional reviewers are generally unable to cover every small business, the invention makes it possible to compile a broader range of user comments and associated summaries in one place, which can be quite valuable as people are frequently influenced by what other people may say and, in effect, the invention provides for extended 'word of mouth' or 'across the back fence' distribution of information.

One important advantage of the invention is that it doesn't require a large number reviews in order to generate a summary and rating. For example, if we have a database of 200 reviews then summarization is easier by just focusing on frequent keywords. However, when there are 10 reviews or less, then the instant approach of the invention provides an innovative method for aggregating, analyzing and summarizing the information. This information can then be made available broadly through the internet, by cell phone, iPod, interactive TV, gaming consoles and any other networked or cached storage devices.

The system also provides capability to use the same parsing and semantic extraction capabilities to provide natural language searching, such as "find the best caviar in San Francisco" or "what is the best oyster bar in Palo Alto" etc. This is useful for people who may be exploring an area and wish to discover new alternatives without browsing all the reviews in a database.

Another important advantage of the invention is that it may be modified to display search results to a user in a format not generally available through traditional media. By way of illustration, while a synopsis or summary of multiple reviews in a short "paragraph" form has been used in guidebooks and traditional online media, there are alternative ways of rendering this information that may be more useful in disclosing details relevant to a user looking to make a decision. For example, as a result of the semantic extraction process, common themes for domain attributes can be identified. As can be seen in FIG. 13, a subset of the output of the semantic extraction for a single restaurant, the "Tamarine" in Palo Alto, Calif., is shown. As indicated, each domain attribute that is qualified by an adjective and corresponding score are given a score and then tabulated. From such meta data, it can be easily seen that the collected reviews are primarily describing user sentiments and experiences for specific items such as "wine list", "Calamari", "atmosphere/vibe" etc. As a result, in this embodiment of the invention, a synopsis or summary may also be provided that is organized around attributes such as "frequency of mentions" and segmentation by food, service and ambiance. These results can then be used indicate whether a restaurant has good food, service or ambiance or some combination of these attributes, in a visual way. For example, such attributes can be rendered on a webpage as a tag cloud, keyword clusters or heat map graph. As a tag cloud is a simple representation of keywords or phrases depicted by highlighting the relevant items, a tag cloud of food related items from reviews could be used as a valuable tool for consumers to consider what they should eat at a restaurant based on others experiences. Similarly, heat maps may be used to visually represent multiple dimensions associated with a restaurant, simultaneously, in a visual form. Regardless of the choice made as to how best to display the results for a particular application, as can easily be understood all of these are forms of summarizing large amounts of user-generated content into simple and easy to use representations can be employed in association with the instant invention. It is also understood that the results may be incorporated into various advertising products to improve click through rates and influencing consumer buying or selection process. For example, extracted sentiment information can be combined with on-the-fly generated advertisements to increase their value and raise the likelihood that a user will take advantage of a particular offer.

Application of domain specific ontology also enable a system practicing the invention to "roll-up" individual sentiments to a particular category. For example, a particular restaurant may be associated with the following yield of tuples from the semantic extraction process: "excellent Apple Martini", "superb Artic Red", and "wonderful Bay Breeze". As a result, over time and with enough occurrences of such references, the system may be able to "deduce" that this particular restaurant serves good cocktails.

As noted above, while the detailed description provided is illustrative, primarily, of the application of the invention to a restaurant review domain, it is understood that the invention can be optimized for use with other domains such as: Doctors and Dentists, Automotive Sales and Repairs, Shops and Boutiques, Travel, Real Estate, and books, antiques, florists, salons, etc. It is also understood that in each domain the following aspects will generally remain the same
  Parser Engine
  Part of Speech Tagger
  Review Scorer
  Summary Generator
while the following aspects will generally need to be created and/or customized:
  Domain Lexicon
  Domain Heuristics
  Scoring Heuristics While the foregoing disclosure has been in connection with user-generated content created in the English language and the invention applies English rules of grammar and construction, the invention may also be modified for use in other languages as well. In migrating the system to support other languages, the existing sentence segmentation and part of speech tagger may be extended to support new languages and incorporate domain specific vocabularies for each new language. In addition, while the ontology, heuristics and structure of information for a given domain (such as restaurants) is likely to remain consistent across international boundaries, the slang and use of specific words and phrases may need to be augmented, including by gathering local knowledge or importing such information from already existing sources.

As a result, and in light of the disclosure provided above, it is clear that there are particular aspects of the instant invention that yield a significant advantage by aggregating content from multiple reviews, as compared to a single site that captures user reviews. First, a typical opinion site captures an audience specific to a demographic and caters to them as their primary customers. For example Yelp.com, by virtue of their marketing and orientation, tends to have a large number of user-generated reviews that are primarily written by 18-28 year olds. Similarly, reviews on sites such as InsiderPages or CitySearch tend to be written by those of a broader age group and, as such, the reviews are reflective of that blend. Experience has shown that, overall, an aggregated site provides a better representation of the population and, as a result, tends to yield more consistent results.

Second, a system that aggregates content from many sites is better able to analyze such content and, thereby, provide personalized experience to an end user. For example, for a search query such as "romantic French restaurant in San Francisco", a system in accordance with invention can return a so-called "splurge" restaurants for a user with a "business" profile, while returning a "date place" restaurant for a user in the 18-25 year old category. Using the invention it is possible to collect multiple reviews from different sites catering to different demographics, resulting in the extraction of experience and sentiment a broader range of reviews.

And third, review aggregators tend to have a higher credibility that individual review sites since it is harder to game the system with "stuffed" reviews and contents. This fundamental premise holds true for all user-generated content, as the system is able to balance out bias by aggregating comments from multiple sources and provide more objective results to the average user.

Accordingly, once multiple sources of data have been identified, an important consideration is the value gained by applying semantic analysis to such user-generated reviews. Some benefits include:

1. Concise content: User reviews, comments and blogs discussing a local business or entity can range from a few reviews to hundreds of reviews, and in general there is no way to prioritize one review over another except through the process of sorting by date. Semantic analysis solves this problem.

2. Extraction within context: In addition to generating a readable summary, semantic analysis of reviews also allows the extraction of a "most talked about" features for any given business, which is often more useful and relevant than simple keyword matching. For example, a keyword match system such as Google will identify a sentence such as "Worst seafood in the bay area" and display it if someone searches for "seafood", whereas the system based on invention will identify that the "seafood" was "worst" and try to pick a better place where diners had a better experience.

3. Differentiation among attributes: The invention focuses on actually quantifying individual attributes of a given domain based on user experiences. As a result the system extracts information necessary to develop scores for food, service and ambiance for restaurants, based on user-generated reviews, and this then allows users to then select places that are recognized as having "good food" as opposed to simply being a "good place", which can frequently be very different.

4. Immediacy: The invention can more quickly generate summaries and ratings for a new business that has just opened and has buzz in a neighborhood where people have started to write about it. Where a professional reviewer could take up to 6 months to become aware of a new restaurant, the system processes all user input with immediacy and generates relevant summaries and ratings. As a variation, the same concept can be used to generate trending graphs on various businesses and how they are performing over time.

In addition, the invention can also be advantageous when used in connection with a new phenomenon known as 'tagging', which is a concept that is currently popular amongst social media sites. Tags provide a mechanism to allow people to categorize their own posts, photos, links, etc. with any word (or "tag") that makes sense. Using the method and system of the invention, key semantics extracted from parsing various reviews can be applied to identify information about a local business such a restaurant or a salon. For example, in the case of restaurants, people may commonly identify a place as a "dive bar", "romantic dinner", "best splurge" or "new york style pizza". As more users review any given location, similarly identified "tags" show up higher in priority and can be used as a means to help make choices or selections. Many websites such as Technorati and Flickr use tags to help users identify "hot" topics or photos, but the challenge in providing useful "tag" information to users is one of building up critical mass of "tags" so people can easily search on them. The invention leverages existing user content in the form of reviews, blogs and pictures and can create automated "tags" that are easily searchable. Since the tagging process coupled to the invention is also automated, it may be helpful in identifying emerging trends or topics from unstructured user-generated content. Two user reviews are examined by way of example:

Review 1: "Excellent food in an attractive atmosphere with fine service. Wonderful fresh seafood prepared in innovative ways with nice presentation. Exensive."

Review 2: "Great for those special-occasion fine dining experiences (since it certainly is not cheap). The food was great and the service as well, but I was quite intimidated by the wine-list, and the sommelier did nothing to alleviate that. But overall a very nice place."

Using a system constructed in accordance with the invention, key phrases from the domain lexicon are identified and tags extracted automatically, so that the corresponding tags generated from the reviews would be:

Review 1: "Excellent food", "attractive atmosphere", "fine service", "fresh seafood", "expensive"

Review 2: "Special-occasion", "fine dining", "greatfood", "great service", "niceplace"

As noted above, as multiple reviews are processed, common tags are identified and grouped into similar categories that can then be easily searched by end users.

Illustrations of exemplar web pages generated in accordance with the teachings of the invention, and illustrating the concepts discussed herewith, are presented in FIGS. 14A and 14B and FIGS. 16A and 16B. Turning first to FIGS. 14A and 14B, the search results for restaurant "Junnoon" in Palo Alto, Calif. are shown. This screen shows the extracted summaries and sentiments from a multiplicity of sources, including blogs, online review sites and traditional media sources. As can be seen, for each source "boo's", or negative sentiment comments, and "rah's", or positive sentiment comments, are displayed as groups of tuples. In this style of rendering the invention analyzes each source and "bubble's up" tuples, comprised of a qualifier and a noun phrases such as "creamy sauce" or "excellent masala" or "inedible velvet lamb kabob", so that the most relevant tuples are displayed to the consumer, which helps enable taking away a "quick gist" of all the reviews from that source. A flow chart illustrating the extraction of such tuples is provided in FIG. 15.

Figure 15:
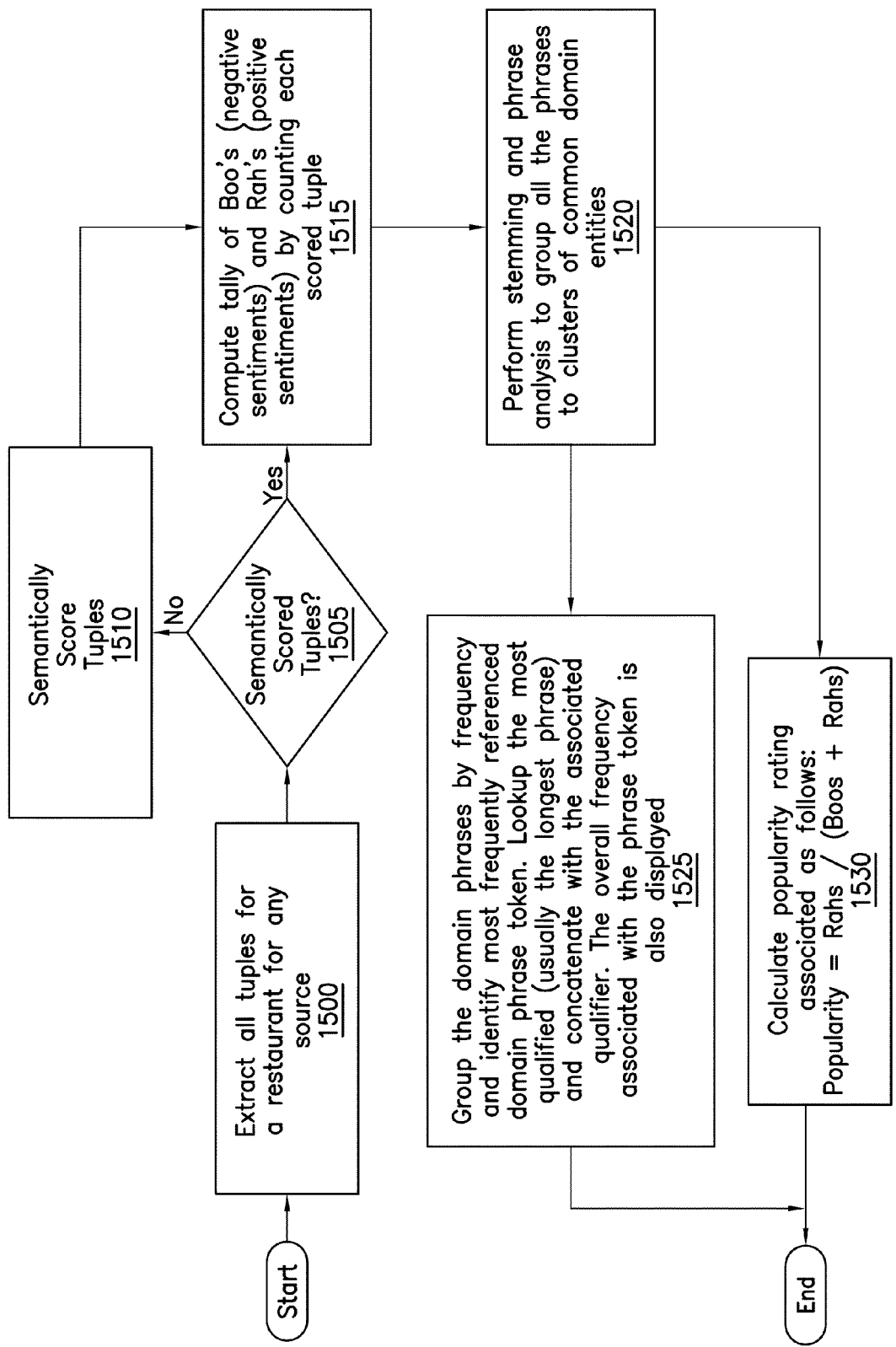
FIG. 15 is a flowchart illustrating an element of the computation of ratings in accordance with the invention.

FIG. 15 shows a flowchart in accordance with one or more embodiments of the invention. First, in STEP 1500, all tuples for a restaurant are extracted (for any source). In STEP 1505, a check is performed to determine whether the tuples have been semantically scored. If not, the tuples are scored in STEP 1510. If so, in STEP 1515, a tally of all Boo's (negative sentiments) and Rah's (positive sentiments) is computed by counting each scored tuple. Next, stemming and phrase analysis is performed to group all phrases into clusters corresponding to common domain entities (STEP 1520). Lastly, in STEP 1525, the domain phrases are grouped by frequency and the most frequently referenced domain phrase token is identified. The most qualified is identified (usually the longest phrase) and concatenated with the associated qualifier. The overall frequency associated with the phrase is also displayed. As an alternative to STEP 1525 (or in parallel with it), STEP 1530 calculates a popularity rating based on the following formula: Popularity=Rahs/(Boos+Rahs)

Figure 16B:
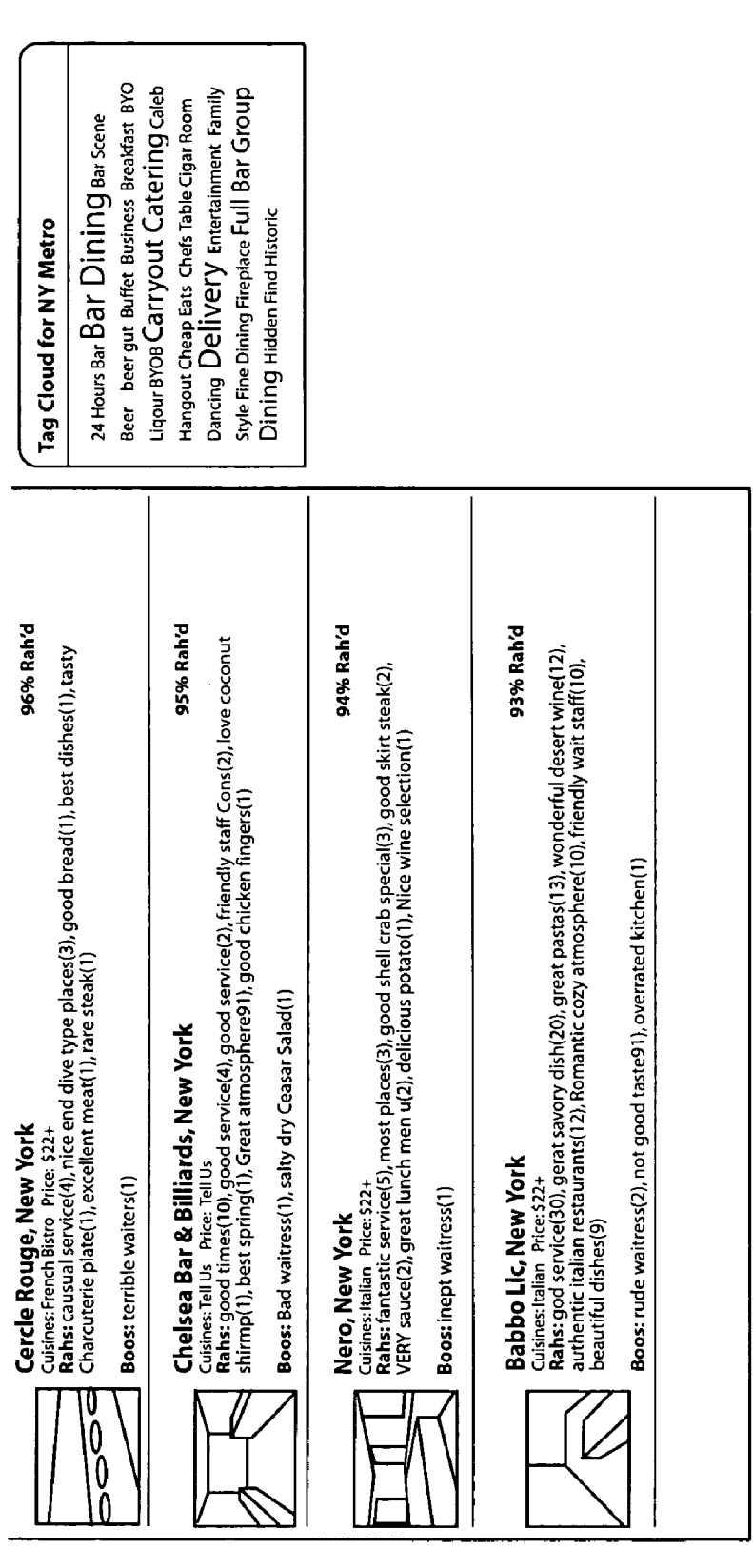
FIG. 16B illustrates the bottom half of a web page generated in accordance with an embodiment of the invention, the top half of which is illustrated in FIG. 16A.

A second web page generated in accordance with the teachings of the invention is illustrated in FIGS. 16A and 16B. This is a "roll-up" view of all the information for such tuples across multiple sources and provides a top level summary of the most popular, or most "rah'd" restaurants in an area, in this case New York. This meta data is valuable since it is a domain specific aggregation of written comments about a restaurant and over time other information can be added to this tally to truly represent the sentiment associated with a local business. FIG. 16B also illustrates an example of a tag cloud discussed above.

Accordingly, a method and system that specifically addresses the problem of how to easily analyze all user-generated content, in various forms, relevant to a particular topic, or related group of topics, and then provide the ability to search within this defined group presenting a searcher with the most relevant information is disclosed. The invention teaches a method and system for capturing, extracting, categorizing and displaying, in a customizable format, both the substance and the sentiment embodied within user-generated content, such as comments or reviews written by non-professional reviewers, collected from multiple sites on the internet, and is able to return a summary, or "gist", of most relevant aspects from all user comments, condensed into an abstract that can help the searcher understand the condensed conclusion of the relevant reviews, enabling them to make a decision without the need to read through all the reviews.

The above disclosure is presented as being sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Further, it will be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

Finally, it is also to be understood that the following claims are intended to cover all of the generic and specific features of the invention herein described and all statements of the scope of the invention, which, as a matter of language, might be said to fall there between.

What is claimed is:

1. A method for analyzing user-generated content, comprising:
   collecting, by a processor, a review of a business from a website;
   extracting, by the processor, a sentence from the review;
   identifying, processor and within the sentence, an attribute-value comprising a noun and a descriptive term describing the noun, wherein the descriptive term comprises an adjective and an adverb corresponding to the adjective;
   obtaining, by the processor, an adjective score for the adjective from a rating system lookup table;
   assigning, by the processor, a heuristic rule score to the adverb; and
   calculating, by the processor, a sentence review score for the sentence by summing the adjective score and the heuristic rule score.

2. The method of claim 1, wherein the review is derived from a blog.

3. The method of claim 1, wherein the review is for a product sold by the business.

4. The method of claim 1, further comprising:
mapping the noun to a core attribute of the business;
identifying a plurality of sentence review scores including the sentence review score corresponding to the core attribute of the business; and
calculating a comprehensive review of the core attribute for the business based on the plurality of sentence review scores.

5. The method of claim 4, wherein the business is a restaurant, and wherein the core attribute is one selected from a group consisting of price, service, ambiance, and food.

6. The method of claim 1, further comprising:
collecting a plurality of reviews for the business;
calculating a frequency of occurrence of the attribute-value within the plurality of reviews; and
displaying the attribute-value according to the frequency of occurrence.

7. The method of claim 1, further comprising:
collecting a plurality of reviews for the business;
identifying a plurality of favorable attribute-values within the plurality of reviews, wherein the plurality of favorable attribute-values includes the attribute-value; and
displaying, on an advertisement, at least one of the plurality of favorable attribute-values.

8. The method of claim 1, further comprising:
receiving, from a user, a search query comprising the noun;
identifying, based on the search query, a plurality of sentence review scores comprising the sentence review score;
calculating, based on the plurality of sentence review scores and using a normalization algorithm, a plurality of normalized sentence review scores;
calculating a representative sentence score based on the plurality of normalized sentence review scores; and
outputting the representative sentence score to the user.

9. The method of claim 1, further comprising:
retrieving a plurality of attribute-values corresponding to the review and comprising the attribute-value; and
generating a summary of the review comprising a plurality of words from the plurality of attribute-values.

10. The method of claim 1, wherein the rating system lookup table uses a third party lexical reference system.

11. The method of claim 10, further comprising:
identifying a dictionary comprising a plurality of words; and
mapping the noun to a word of the plurality of words, wherein the noun is a synonym of the word, and wherein mapping the noun to the word is done by the third party lexical reference system.

12. A system for analyzing user-generated content, comprising:
a hardware processor;
a semantic crawler executing on the hardware processor and configured to collect a review of a business from a website;
a parser executing on the hardware processor and configured to extract a sentence from the review; and
a semantic processor executing on the hardware processor and configured to:
identify, within the sentence, an attribute-value comprising a noun and a descriptive term describing the noun, wherein the descriptive term comprises an adjective and an adverb corresponding to the adjective;
obtain an adjective score for the adjective from a rating system lookup table;
assign a heuristic rule score to the adverb; and
calculate a sentence review score for the sentence by summing the adjective score and the heuristic rule score.

13. The system of claim 12, wherein the business is a restaurant and wherein the semantic processor is further configured to:
categorize, based on the sentence review score, the attribute-value as one selected from a group consisting of positive, negative, and neutral.

14. The system of claim 12, wherein the semantic processor is further configured to:
collect a plurality of reviews for the business;
identify a plurality of favorable attribute-values from the plurality of reviews, wherein the plurality of favorable attribute-values includes the attribute-value; and
display, on an advertisement, at least one of the plurality of favorable attribute-values.

15. The system of claim 12, wherein the semantic processor is further configured to:
receive, from a user, a search query comprising the noun from a user;
identify, based on the search query, a plurality of sentence review scores comprising the sentence review score;
calculate, based on the plurality of sentence review scores and using a normalization algorithm, a plurality of normalized sentence review scores;
calculate a representative sentence score based on the plurality of normalized sentence review scores; and
output the representative sentence score to the user.

16. The system of claim 12, wherein the semantic processor is further configured to:
map the noun to a core attribute of the business;
identify a plurality of sentence review scores including the sentence review score corresponding to the core attribute of the business; and
calculate a comprehensive review of the core attribute of the business based on the plurality of sentence review scores.

17. The system of claim 12, wherein the semantic processor is further configured to:
collect a plurality of reviews for the business;
calculate a frequency of occurrence of the attribute-value within the plurality of reviews; and
display the attribute-value according to the frequency of occurrence.

18. A computer-readable storage medium storing a plurality of instructions for analyzing user-generated content, the plurality of instructions comprising functionality to:
collect a review of a business from a website;
extract a sentence from the review;
identify, within the sentence, an attribute-value comprising a noun and a descriptive term describing the noun, wherein the descriptive term comprises an adjective and an adverb corresponding to the adjective;
obtain an adjective score for the adjective from a rating system lookup table;
assign a heuristic rule score to the adverb; and
calculate a sentence review score for the sentence by summing the adjective score and the heuristic rule score.

19. The computer-readable storage medium of claim 18, wherein the plurality of instructions further comprise functionality to:
receive, from a user, a search query comprising the noun;
identify, based on the search query, a plurality of sentence review scores comprising the sentence review score;

calculate, based on the plurality of sentence review scores and using a normalization algorithm, a plurality of normalized sentence review scores;

calculate a representative sentence score based on the plurality of normalized sentence review scores; and output the representative sentence score to the user.

20. The computer-readable storage medium of claim 18, wherein the plurality of instructions further comprise functionality to:

map the noun to a core attribute of the business;

identify a plurality of sentence review scores including the sentence review score corresponding to the core attribute of the business; and calculate a comprehensive review of the core attribute of the business based on the plurality of sentence review scores.

21. The computer-readable storage medium of claim 18, wherein the plurality of instructions further comprise functionality to:

collect a plurality of reviews for the business;

calculate a frequency of occurrence of the attribute-value within the plurality of reviews; and display the attribute-value according to the frequency of occurrence.

* * * * *

UNITED STATES PATENT AND TRADEMARK OFFICE
CERTIFICATE OF CORRECTION

| | | |
|---|---|---|
| PATENT NO. | : 7,930,302 B2 | Page 1 of 1 |
| APPLICATION NO. | : 11/982936 | |
| DATED | : April 19, 2011 | |
| INVENTOR(S) | : Nagaraju Bandaru et al. | |

It is certified that error appears in the above-identified patent and that said Letters Patent is hereby corrected as shown below:

Column 22 (line 54), after "identifying,", --by the-- should be added.

Signed and Sealed this
Fifth Day of July, 2011

David J. Kappos
*Director of the United States Patent and Trademark Office*